(12) United States Patent
Xu et al.

(10) Patent No.: US 9,024,460 B2
(45) Date of Patent: May 5, 2015

(54) WASTE HEAT RECOVERY SYSTEM GENERATOR ENCAPSULATION

(75) Inventors: James Jun Xu, Niskayuna, NY (US); Albert Andreas Scharl, Innsbruck (AT); Eric Joseph Blumber, Los Angeles, CA (US); Shamim Imani, Fullerton, CA (US)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 13/343,490

(22) Filed: Jan. 4, 2012

(65) Prior Publication Data

US 2013/0168964 A1 Jul. 4, 2013

(51) Int. Cl.
*F01D 15/10* (2006.01)
*F01D 25/00* (2006.01)
*F01K 23/04* (2006.01)
*F01K 25/08* (2006.01)

(52) U.S. Cl.
CPC .............. *F01D 15/10* (2013.01); *F01D 25/007* (2013.01); *F01K 23/04* (2013.01); *F01K 25/08* (2013.01); *Y02E 50/12* (2013.01); *Y10T 29/49009* (2015.01); *Y10T 29/49885* (2015.01)

(58) Field of Classification Search
USPC ............. 290/52; 310/54, 58–59; 60/670, 671, 60/39.02, 39.08, 651, 618
See application file for complete search history.

(56) References Cited

U.S. PATENT DOCUMENTS

| | | | |
|---|---|---|---|
| 2,276,695 A | 3/1942 | Lavarello | |
| 2,409,857 A | 10/1946 | Hines et al. | |
| 2,465,761 A | 3/1949 | Staude | |
| 2,917,636 A | 12/1959 | Akeley | |
| 3,035,557 A | 5/1962 | Litwinoff et al. | |
| 3,060,335 A | 10/1962 | Greenwald | |
| 3,064,942 A | 11/1962 | Martin | |
| 3,212,477 A | 10/1965 | Gerber et al. | |
| 3,232,050 A | 2/1966 | Robinson et al. | |
| 3,349,548 A | 10/1967 | Boyen | |
| 3,376,857 A | 4/1968 | Smith | |
| 3,393,515 A | 7/1968 | Tabor et al. | |
| 3,439,201 A | 4/1969 | Levy et al. | |

(Continued)

FOREIGN PATENT DOCUMENTS

DE 102008019813 10/2009
EP 0462724 A1 12/1991

(Continued)

OTHER PUBLICATIONS

Keith Gawlik et al., Advanced Binary Cycles: Optimum Working Fluids, Jun. 2010, pp. 1809-1814.

(Continued)

*Primary Examiner* — Jean F Duverne
(74) *Attorney, Agent, or Firm* — Fletcher Yoder, P.C.

(57) ABSTRACT

In one embodiment, a system includes a generator configured to receive a flow of an organic working fluid. The generator includes a stator and a permanent magnet rotor configured to rotate within the stator to generate electricity. The generator further includes one or more components disposed within the generator and configured to be exposed to the flow of the organic working fluid. The one or more components each include an underlying component, and an encapsulant configured to withstand exposure to the organic working fluid to inhibit contact between the underlying component and the organic working fluid.

20 Claims, 9 Drawing Sheets

(56) References Cited

U.S. PATENT DOCUMENTS

| | | |
|---|---|---|
| 3,530,836 A | 9/1970 | Caravatti |
| 3,599,424 A | 8/1971 | Yampolsky |
| 3,728,857 A | 4/1973 | Nichols |
| 3,830,062 A | 8/1974 | Morgan et al. |
| 3,937,855 A | 2/1976 | Gruenwald |
| 3,943,443 A | 3/1976 | Kimura et al. |
| 3,950,950 A | 4/1976 | Doerner et al. |
| 3,999,787 A | 12/1976 | Park |
| 4,033,141 A | 7/1977 | Gustafsson |
| 4,041,709 A | 8/1977 | Rajakovies |
| 4,170,435 A | 10/1979 | Swearingen |
| 4,185,465 A | 1/1980 | Shaw |
| 4,260,914 A | 4/1981 | Hertrich |
| 4,262,495 A | 4/1981 | Gupta et al. |
| 4,262,636 A | 4/1981 | Augsburger |
| 4,301,375 A | 11/1981 | Anderson |
| 4,309,870 A * | 1/1982 | Guest et al. .................. 60/39.08 |
| 4,341,151 A | 7/1982 | Sakamoto |
| 4,358,697 A | 11/1982 | Liu et al. |
| 4,362,020 A | 12/1982 | Meacher et al. |
| 4,363,216 A | 12/1982 | Bronicki |
| 4,415,024 A | 11/1983 | Baker |
| 4,424,665 A * | 1/1984 | Guest et al. ...................... 60/779 |
| 4,463,567 A | 8/1984 | Amend et al. |
| 4,472,355 A | 9/1984 | Hickam et al. |
| 4,479,354 A | 10/1984 | Cosby |
| 4,512,851 A | 4/1985 | Swearingen |
| 4,544,855 A | 10/1985 | Prenner et al. |
| 4,553,397 A | 11/1985 | Wilensky |
| 4,555,637 A | 11/1985 | Irvine |
| 4,558,228 A | 12/1985 | Larjola |
| 4,635,412 A | 1/1987 | Le Poittevin |
| 4,635,712 A | 1/1987 | Baker et al. |
| 4,659,969 A | 4/1987 | Stupak, Jr. |
| 4,738,111 A | 4/1988 | Edwards |
| 4,740,711 A | 4/1988 | Sato et al. |
| 4,748,814 A | 6/1988 | Tanji et al. |
| 4,760,705 A | 8/1988 | Yogev et al. |
| 4,806,662 A | 2/1989 | Bargigia et al. |
| 4,838,027 A | 6/1989 | Rosado et al. |
| 4,888,947 A * | 12/1989 | Thompson .................... 60/39.08 |
| 4,891,934 A * | 1/1990 | Huelster ...................... 60/39.08 |
| 4,996,845 A | 3/1991 | Kim |
| 5,000,003 A | 3/1991 | Wicks |
| 5,003,211 A | 3/1991 | Groom |
| 5,021,697 A | 6/1991 | Kralick |
| 5,083,040 A | 1/1992 | Whitford et al. |
| D325,080 S | 3/1992 | Wortham |
| 5,107,682 A | 4/1992 | Cosby |
| 5,196,746 A * | 3/1993 | McCabria ........................ 310/54 |
| 5,241,425 A | 8/1993 | Sakamoto et al. |
| 5,263,816 A | 11/1993 | Weimer et al. |
| 5,285,123 A | 2/1994 | Kataoka et al. |
| 5,315,197 A | 5/1994 | Meeks et al. |
| 5,351,487 A | 10/1994 | Abdelmalek |
| 5,481,145 A | 1/1996 | Canders et al. |
| 5,514,924 A | 5/1996 | McMullen et al. |
| 5,531,073 A | 7/1996 | Bronicki et al. |
| 5,559,379 A | 9/1996 | Voss |
| 5,611,411 A * | 3/1997 | Reilly, III ....................... 184/6.4 |
| 5,627,420 A | 5/1997 | Rinker et al. |
| 5,640,064 A | 6/1997 | Boyd, Jr. et al. |
| 5,668,429 A | 9/1997 | Boyd, Jr. et al. |
| 5,671,601 A | 9/1997 | Bronicki et al. |
| 5,672,047 A | 9/1997 | Birkholz |
| 5,743,094 A | 4/1998 | Zimron et al. |
| 5,780,932 A | 7/1998 | Laffont |
| 5,818,242 A | 10/1998 | Grzybowski et al. |
| 5,852,338 A | 12/1998 | Boyd, Jr. et al. |
| 5,894,182 A | 4/1999 | Saban et al. |
| 5,911,453 A | 6/1999 | Boyd, Jr. et al. |
| 5,942,829 A | 8/1999 | Huynh |
| 5,970,714 A | 10/1999 | Bronicki et al. |
| 5,990,588 A | 11/1999 | Kliman |
| 5,994,804 A | 11/1999 | Grennan et al. |
| 6,002,191 A | 12/1999 | Saban |
| 6,018,207 A | 1/2000 | Saban et al. |
| 6,041,604 A | 3/2000 | Nicodemus |
| 6,087,744 A | 7/2000 | Glauning |
| 6,088,905 A | 7/2000 | Boyd, Jr. et al. |
| 6,130,494 A | 10/2000 | Schob |
| 6,140,733 A | 10/2000 | Wedde et al. |
| 6,148,967 A | 11/2000 | Huynh |
| 6,167,703 B1 | 1/2001 | Rumez et al. |
| 6,177,735 B1 | 1/2001 | Chapman et al. |
| 6,191,511 B1 | 2/2001 | Zysset |
| 6,223,417 B1 | 5/2001 | Saban et al. |
| 6,250,258 B1 | 6/2001 | Liebig |
| 6,259,166 B1 | 7/2001 | Tommer |
| 6,270,309 B1 | 8/2001 | Ghetzler et al. |
| 6,290,024 B1 * | 9/2001 | Ehlert .......................... 184/6.26 |
| 6,304,015 B1 | 10/2001 | Filatov et al. |
| 6,324,494 B1 | 11/2001 | Saban |
| 6,325,142 B1 | 12/2001 | Bosley et al. |
| 6,343,570 B1 | 2/2002 | Schmid et al. |
| 6,388,356 B1 | 5/2002 | Saban |
| D459,796 S | 7/2002 | Moreno |
| 6,422,017 B1 | 7/2002 | Bassily |
| 6,437,468 B2 | 8/2002 | Stahl et al. |
| 6,465,924 B1 | 10/2002 | Maejima |
| 6,504,337 B1 | 1/2003 | Saban et al. |
| 6,539,720 B2 | 4/2003 | Rouse et al. |
| 6,598,397 B2 | 7/2003 | Hanna et al. |
| 6,663,347 B2 | 12/2003 | Decker et al. |
| 6,664,680 B1 | 12/2003 | Gabrys |
| 6,692,222 B2 | 2/2004 | Prinz et al. |
| 6,700,258 B2 | 3/2004 | McMullen et al. |
| 6,727,617 B2 | 4/2004 | McMullen et al. |
| 6,777,847 B1 | 8/2004 | Saban et al. |
| 6,793,042 B2 * | 9/2004 | Brouillet ....................... 184/6.11 |
| 6,794,780 B2 | 9/2004 | Silber et al. |
| 6,856,062 B2 | 2/2005 | Heiberger et al. |
| 6,876,194 B2 | 4/2005 | Lin et al. |
| 6,880,344 B2 | 4/2005 | Radcliff et al. |
| 6,897,587 B1 | 5/2005 | McMullen et al. |
| 6,900,553 B2 | 5/2005 | Gozdawa |
| 6,934,666 B2 | 8/2005 | Saban et al. |
| 6,960,840 B2 | 11/2005 | Willis et al. |
| 6,967,461 B1 | 11/2005 | Markunas et al. |
| 6,986,251 B2 | 1/2006 | Radcliff et al. |
| 7,019,412 B2 | 3/2006 | Ruggieri et al. |
| 7,042,118 B2 | 5/2006 | McMullen et al. |
| 7,047,744 B1 | 5/2006 | Robertson et al. |
| 7,075,399 B2 | 7/2006 | Saban et al. |
| 7,100,380 B2 | 9/2006 | Brasz et al. |
| 7,125,223 B2 | 10/2006 | Turnquist et al. |
| 7,146,813 B2 | 12/2006 | Brasz et al. |
| 7,174,716 B2 | 2/2007 | Brasz et al. |
| 7,208,854 B1 | 4/2007 | Saban et al. |
| 7,225,621 B2 | 6/2007 | Zimron et al. |
| 7,387,189 B2 * | 6/2008 | James et al. .................. 184/6.11 |
| 7,436,922 B2 | 10/2008 | Peter |
| 7,557,480 B2 | 7/2009 | Filatov |
| 7,581,921 B2 | 9/2009 | Bagepalli et al. |
| 7,594,399 B2 | 9/2009 | Lehar et al. |
| 7,638,892 B2 | 12/2009 | Myers |
| 7,793,505 B2 * | 9/2010 | Dooley ........................... 60/772 |
| 7,841,306 B2 | 11/2010 | Myers et al. |
| 7,942,001 B2 | 5/2011 | Radcliff et al. |
| 8,061,139 B2 * | 11/2011 | Bronicki ......................... 60/618 |
| 8,341,960 B2 | 1/2013 | Berger et al. |
| 8,375,716 B2 | 2/2013 | Ramaswamy et al. |
| 8,739,538 B2 * | 6/2014 | Myers et al. ..................... 60/670 |
| 2003/0074165 A1 | 4/2003 | Saban et al. |
| 2004/0020206 A1 | 2/2004 | Sullivan et al. |
| 2004/0027011 A1 | 2/2004 | Bostwick et al. |
| 2004/0189429 A1 | 9/2004 | Saban et al. |
| 2005/0093391 A1 | 5/2005 | McMullen et al. |
| 2005/0262848 A1 | 12/2005 | Held |
| 2006/0185366 A1 | 8/2006 | Kahlbau et al. |
| 2007/0018516 A1 | 1/2007 | Pal et al. |
| 2007/0056285 A1 | 3/2007 | Brewington |
| 2007/0063594 A1 | 3/2007 | Huynh |
| 2007/0200438 A1 | 8/2007 | Kaminski et al. |

(56) References Cited

U.S. PATENT DOCUMENTS

| | | |
|---|---|---|
| 2007/0204623 A1 | 9/2007 | Rollins |
| 2008/0103632 A1 | 5/2008 | Saban et al. |
| 2008/0224551 A1 | 9/2008 | Saban et al. |
| 2008/0246281 A1 | 10/2008 | Agrawal et al. |
| 2008/0246373 A1 | 10/2008 | Filatov |
| 2008/0250789 A1 | 10/2008 | Myers et al. |
| 2008/0252077 A1 | 10/2008 | Myers |
| 2008/0252078 A1 | 10/2008 | Myers et al. |
| 2009/0004032 A1 | 1/2009 | Kaupert |
| 2009/0126371 A1 | 5/2009 | Bujac et al. |
| 2009/0217693 A1 | 9/2009 | Kikuchi et al. |
| 2009/0301078 A1 | 12/2009 | Chillar et al. |
| 2010/0043439 A1 | 2/2010 | Lourenco et al. |
| 2010/0071368 A1 | 3/2010 | Bronicki et al. |
| 2010/0126172 A1 | 5/2010 | Sami |
| 2010/0263380 A1 | 10/2010 | Biederman et al. |
| 2010/0319346 A1 | 12/2010 | Ast et al. |
| 2010/0326076 A1 | 12/2010 | Ast et al. |
| 2011/0061388 A1 | 3/2011 | Lehar et al. |
| 2011/0138809 A1 | 6/2011 | Ramaswamy et al. |
| 2011/0289922 A1 | 12/2011 | Myers et al. |

FOREIGN PATENT DOCUMENTS

| | | |
|---|---|---|
| EP | 1905948 A2 | 4/2008 |
| GB | 2225813 | 6/1990 |
| GB | 2405450 | 3/2005 |
| JP | 55075502 | 6/1980 |
| JP | 57068507 | 4/1982 |
| JP | 63129839 | 6/1988 |
| JP | 63277443 | 11/1988 |
| JP | 3271507 | 12/1991 |
| JP | 8218816 | 8/1996 |
| JP | 9112207 | 4/1997 |
| JP | 2001078390 | 3/2001 |
| JP | 2007127060 | 5/2007 |
| WO | 9301397 | 1/1993 |
| WO | 03100946 | 12/2003 |
| WO | 2006/104490 A1 | 10/2006 |
| WO | 2007088194 | 8/2007 |
| WO | 2008061271 | 5/2008 |
| WO | 2008090628 | 7/2008 |
| WO | 2009/045117 A2 | 4/2009 |
| WO | 2010143046 | 12/2010 |
| WO | 2011/117074 A1 | 9/2011 |

OTHER PUBLICATIONS

Search report issued in connection with GB application No. 1222997.7, May 3, 2013.
Written Opinion of the International Searching Authority issued in corresponding International Application No. PCT/US2011/036024, Nov. 4, 2011, 7 pages.
York International Service Instructions for Liquid Cooled Optispeed Compressor Drive, 2004, 52 pages.
Johnson Controls Inc. "Model YMC2 Magnetic Bearing Centrifugal Liquid Chillers Design Level A," 2010, 56 pages.
JP 8218816 A (Machine Translation from JPO), http://dossier1.ipdl.inpit.go.jp/AIPN/odse_top_dn.ipdi?N000=7400 Aug. 27, 1996.
International Search Report Issued in Connection with PCT/US2011/036638, Sep. 1, 2011.
International Search Report Issued in Connection with PCT/US2011/037710, Oct. 4, 2011.
European Office Action issued in Connection with EP Application No. 08 745 761.0, Jan. 19, 2011.
GE Oil & Gas, "Turboexpander-Generators for Natural Gas Applications," [onlin], <http://www.ge-energy.com/businesses/ge oilandgas/en/literalure/en/downloads/turbo generators.pdf>, 7 pages, retrieved May 19, 2010.
Atlas Copco, "Atlas Copco Gas and Process Solutions, GT and T Series: Process-engineered Centrifugal Compressors," [online]<http://hv'Arw.atlascopco-ga]2.COJTI/download ftlc.Db]2?id=3 23>, 24 pp. retrieved May 19, 2010.
International Search Report for PCT/US2008/060324 dated Jan. 9, 2010.
International Preliminary Report on Patentability issued in International Application No. PCT/US2008/057082 on Mar. 16, 2009; 10 pages.
International Search Report and Written Opinion of the International Searching Authority issued in Internaional Application No. PCT/US2008/057082 on Jul. 8, 2008, 8 Pages.
International Preliminary Report on Patentability issued in International Application No. PCT/US2008/060227; Jun. 17, 2009; 10 pages.
Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.
Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.
McMullen, Patrick T. et al., "Combination Radial-Axial Magnetic Bearing," Seventh International Symposium on Magnetic Bearing, ETH Zurich, Aug. 23-25, 2000, pp. 473-478.
Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.
McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.
Hawkins, Larry et al., "Development of an AMB Energy Storage Flywheel for Industrial Applications," 7th International Symposium on Magnetic Suspension Technology, Fukoka, Japan, Oct. 2003, 7 pages.
Hawkins, Larry et al., "Development of an AMB Energy Storage Flywheel for Commercial Application," International Symposium on Magnetic Suspension Technology, Dresden, Germany, Sep. 2005, 5 pages.
Huynh, Co et al., "Flywheel Energy Storage System for Naval Applications," GT 2006-90270, Proceedings of GT 2006 ASME Turbo Expo 2006: Power for Land, Sea & Air, Barcelona, Spain, May 8-11, 2006, pp. 1-9.
McMullen, Patrick et al., "Flywheel Energy Storage System with AMB's and Hybrid Backup Bearings," Tenth International Symposium on Magnetic Bearings, Martigny, Switzerland, Aug. 21-23, 2006, 6 pages.
United States Patent Office's prosecution file for U.S. Appl. No. 11/524,690, 192 pages.
United States Patent Office's prosecution file for U.S. Appl. No. 12/049,117, 295 pages.
United States Patent Office's prosecution file for U.S. Appl. No. 11/735,849, 127 pages.
PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.
Ormat Web Site: "Recovered Energy Generation in the Cement Industry," (2 pages) available at http://www.ormat.com/technology_cement_2.htm, printed Jul. 26, 2006.
Turboden—Organic Rankine Cycle, "Turboden High Efficiency Rankine for Renewable Energy and Heat Reovery," (2 pages) available at http://www.turboden.it/orc.asp, 1999-2003, printed Jul. 27, 2006.
Turboden—Applications, "Turboden High Efficiency Rankine for Renewable Energy and Heat Reovery," (1 page) available at http://www.turboden.it/applications_detail_asp?titolo=Heat+recovery, 1999-2003, printed Jul. 27, 2006.
Freepower ORC Electricity Company Home Page, "Welcome to Freepower," (1 page) available at http://www.freepower.co.uk/, Jul. 26, 2006.

(56) References Cited

OTHER PUBLICATIONS

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.
Freepower ORC Electricity Company with Industrial Processes, "Industrial Processes," (1 page) available at http://www.freepower.co.uk/site-5.htm, 2000-2006, printed Jul. 26, 2006.
Freepower ORC Electricity Company FP6 Product Description, "FP6," (1 page) available at http://www.freepower.co.uk/fp6.htm, 2000-2006, printed Jul. 26, 2006.
Freepower ORC Electricity Company FP120 Product Description, "FP120," (1 page) available at http://www.freepower.co.uk/fp120.htm, 2000-2006, printed Jul. 26, 2006.
Freepower ORC Electricity Company FP60 Product Description, "FP60," (1 page) available at http://www.freepower.co.uk/fp60.htm, 2000-2006, printed Jul. 26, 2006.
Freepower ORC Electricity Company Products Overview "A System Overview," (1 page) available at http://www.freepower.co.uk/tech-overview.htm, 2000-2006, printed Jul. 26, 2006.
Freepower FP6, "Freepower FP6 Specification & Dimensions for 6kWe Electricity Generating Equipment," (2 pages) 2000-2004, printed Jul. 26, 2006.
Honeywell, "Genetron® 245fa Applications Development Guide," (15 pages), 2000.
Atlas Copco, "Atlas Copco Gas and Process Solutions, Producing Tomorrow's Energy," [online]<http://www.atlascopco-gap.com/download_file.php?id=458?8 pages, retrieved May 19, 2010.
Atlas Copco, "Atlas Copco Gas and Process Solutions, Driving Expander Technology," [online]<http://www.atlascopco-gap.com/download_file.php?id=457?, 24 pp. retrieved May 19, 2010.
International Search Report and Written Opinion of the International Searching Authority issued in corresponding International Application No. PCT/US2008/060227 on Oct. 28, 2008; 10 pages.

* cited by examiner

US 9,024,460 B2

WASTE HEAT RECOVERY SYSTEM GENERATOR ENCAPSULATION

BACKGROUND OF THE INVENTION

The subject matter disclosed herein relates to waste heat recovery systems, and more specifically, to waste heat recovery systems that employ nonpolar organic solvents as working fluids and that include one or more encapsulated generator components.

Waste heat recovery systems may be employed to recover low-grade heat, such as heat with a temperature below approximately 500° C., from industrial and commercial processes and operations. For example, waste heat recovery systems may be employed to recover low-grade heat from hot exhaust gases produced by gas turbines. Waste heat recovery systems that implement an organic Rankine cycle (ORC) by circulating an organic working fluid may be particularly efficient at recovering low-grade heat due to the relatively low phase change enthalpies of organic working fluids.

In general, ORC systems may circulate an organic working fluid in a closed loop through a cycle of expansion and pressurization to convert heat into work. For example, the working fluid may be directed through a heat exchanger where the working fluid may absorb heat from a heat source, such as exhaust gas, to vaporize the working fluid. The vaporized working fluid may then be expanded across a turbine to drive a load, such as a generator, that produces electricity. The expanded working fluid may then be directed to another heat exchanger to condense the working fluid into a liquid. The liquid working fluid may then be pressurized in a pump and returned to the first heat exchanger. Typical ORC systems may employ a refrigerant, such as R143a or R245fa, as the organic working fluid and may operate at temperatures of approximately 80° C. to 100° C. However, it may be desirable to operate at higher cycle temperatures to increase the system efficiency and power output.

In certain designs, the ORC systems may include an integrated power module that houses the generator and turbine within a single housing. Within the integrated power module, the working fluid may flow through the turbine and then may flow past and/or through the generator. Accordingly, certain components of the generator may be exposed to the vaporized working fluid.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a generator configured to receive a flow of an organic working fluid. The generator includes a stator and a permanent magnet rotor configured to rotate within the stator to generate electricity. The generator further includes one or more components disposed within the generator and configured to be exposed to the flow of the organic working fluid. The one or more components each include an underlying component, and a varnish configured to withstand exposure to the organic working fluid to inhibit contact between the underlying component and the organic working fluid.

In a second embodiment, a system includes a unitary casing, a turbine disposed in the unitary casing and configured to expand an organic working fluid, and a generator disposed in the unitary casing and configured to receive a flow of the organic working fluid exiting the turbine. The generator includes a stator that includes electrical windings encapsulated with an encapsulant configured to withstand exposure to the organic working fluid to inhibit contact between the electrical windings and the organic working fluid. The generator also includes a permanent magnet rotor configured to rotate within the stator to generate electricity.

In a third embodiment, a method includes disposing a component of a generator within a mold and injecting an encapsulant into the mold to encapsulate the component. The generator is configured to receive a flow of an organic working fluid, and the encapsulant is configured to withstand exposure to the organic working fluid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
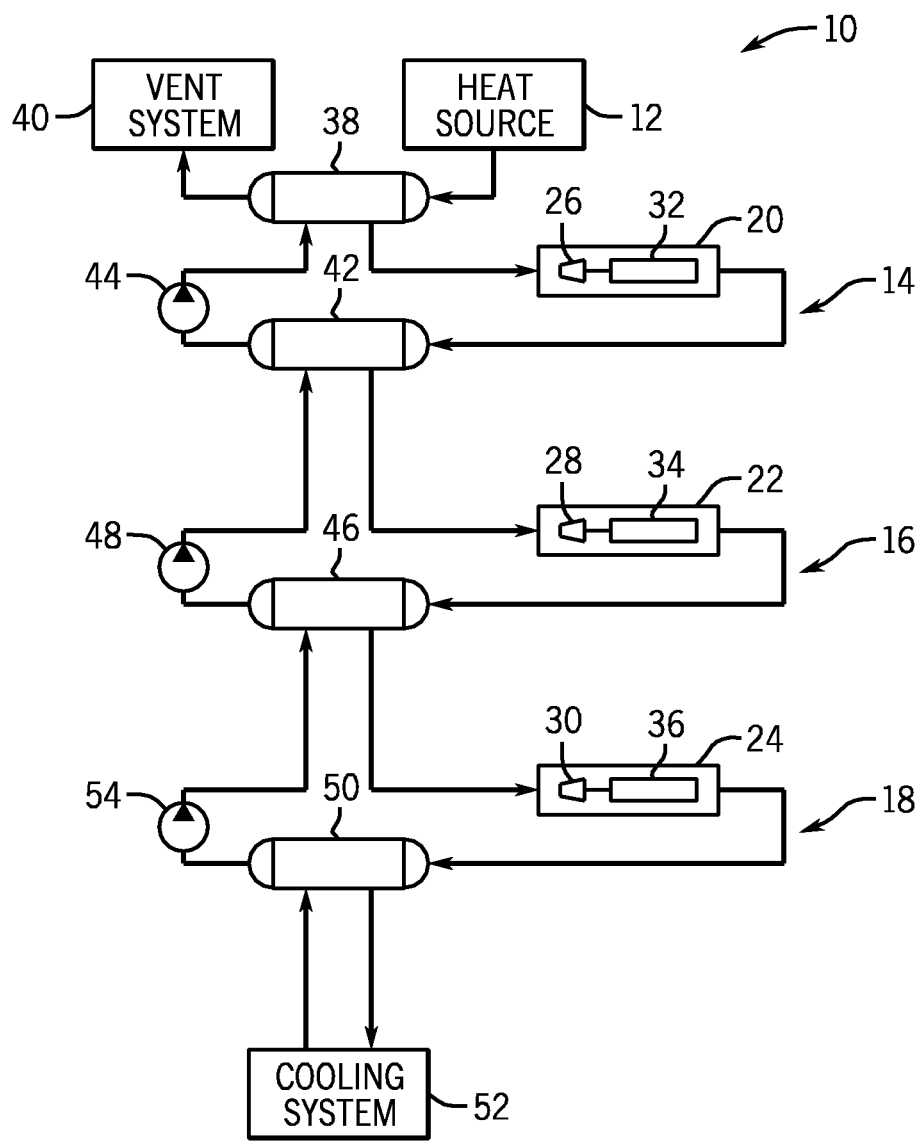
FIG. 1 is a diagrammatical representation of an embodiment of a waste heat recovery system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to waste heat recovery systems that employ nonpolar organic solvents as working fluids. Within the waste heat recovery systems, the nonpolar organic solvents may be directed through integrated power modules that include varnished and/or encapsulated components designed to be compatible with the nonpolar organic solvents at relatively high temperatures. The use of nonpolar organic solvents as working fluids may enable the waste heat recovery systems to operate at relatively higher cycle temperatures (e.g., 180° C. to 250° C.) as compared to traditional waste heat recovery systems that employ lower temperature fluids, such as R134a or R245fa, and that operate at cycle temperatures of approximately 80° C. to 120° C. According to certain embodiments, the nonpolar organic solvents may include toluene and/or cyclohexane. Further, the nonpolar organic solvents may include nonpolar organic solvents with a lower solubility than cyclohexane, such as propane, butane, isobutane, n-pentane, isopentane, isohexane, hexane, or combinations thereof, among others. The use of the nonpolar organic solvents described herein may be particularly well-suited to recovering heat in the low to intermediate temperature range of approximately 100° C. to 300° C., or more specifically, approximately 150° C. to 250° C., and all subranges therebetween.

The waste heat recovery systems may include multiple organic Rankine cycle (ORC) systems arranged in a cascade configuration, with each consecutive ORC system operating at a lower cycle temperature than the preceding ORC system. Each ORC system may direct the working fluid through a cycle of expansion and pressurization to convert waste heat to electricity. In particular, each ORC system may include an integrated power module that includes a turbine and a generator within a single, unitary housing. The working fluid may enter the integrated power module in the vapor phase and may be expanded as it flows through the turbine, which in turn may drive the generator to produce electricity. The working fluid exiting the turbine may then be directed past components of the generator to provide cooling for the generator. Further, in certain embodiments, a portion of the working fluid, such as the working fluid that flows through the seals, may bypass the turbine and join with the working fluid exiting the turbine. The bypass working fluid also may be used to provide cooling for the generator.

Accordingly, the interior components of the integrated power module may be designed to be compatible with the working fluid that flows through the integrated power module at elevated temperatures. For example, according to certain embodiments, one or more components, such as the stator winding, bearing actuators, or sensors, may be varnished and/or encapsulated with a protective coating that inhibits contact of the working fluid with the components. Rather than traditional varnishes that may swell or dissolve when exposed to the organic working fluid at elevated temperatures (e.g., approximately 150° C. to 300° C.), the protective coatings may be designed to withstand exposure to the organic working fluid at elevated temperatures. Further, in certain embodiments, when applied to stator electrical windings and/or the actuator electrical windings, the protective components also may be designed to secure the windings within their respective slots to impede vibration and coil abrasion.

FIG. 1 depicts a waste heat recovery system 10 that may employ nonpolar organic solvents as working fluids to convert waste heat to electricity. Further, the waste heat recovery system 10 may include components that are varnished and/or encapsulated with a protective coating to impede contact of these components with the working fluids. The waste heat recovery system 10 may recover heat from a heat source 12. According to certain embodiments, the heat source 12 may be exhaust gas generated by a gas turbine engine, micro-turbine, reciprocating engine, or geothermal, solar thermal, industrial, chemical or petrochemical processing, or residential heat source. However, in other embodiments, the heat source 12 may be provided by any suitable power generation system that produces waste heat, which can be at temperatures as high as 500° C.

The waste heat recovery system 10 includes multiple ORC systems 14, 16, and 18 arranged in a high efficiency cascade configuration to transfer heat between the ORC systems. Each ORC system 14, 16, and 18 may include a closed loop that circulates a working fluid through a Rankine cycle within the ORC system 14, 16, or 18. The high temperature ORC system 14 may receive heat from the heat source 12 to vaporize the working fluid within the ORC system 14. Heat from the high temperature ORC system 14 may then be transferred to the intermediate temperature ORC system 16 to vaporize the working fluid within the intermediate temperature ORC system 16. Moreover, heat from the intermediate temperature ORC system 16 may then be transferred to the low temperature ORC system 18 to vaporize the working fluid within the low temperature ORC system 18.

Each ORC system 14, 16, and 18 may circulate a nonpolar organic working fluid within a closed loop. According to certain embodiments, the working fluids employed in the ORC systems 14 and 16 may be high temperature nonpolar organic working fluids, such as toluene, siloxanes, thiophene, hydrocarbon refrigerants, or other suitable high temperature nonpolar organic working fluids. Further, in certain embodiments, each ORC system 14 and 16 may circulate a different working fluid. For example, the working fluid employed within the high temperature ORC system 14 may have a condensation temperature that is greater than the boiling point of the working fluid employed within intermediate temperature ORC system 16. However, in other embodiments, the ORC systems 14 and 16 may both employ the same working fluid.

The working fluid employed in the low temperature ORC system 18 may be a low temperature nonpolar organic working fluid, as compared to the working fluids employed in the high temperature and intermediate temperature ORC systems 14 and 16. For example, the working fluid employed within the low temperature ORC system 18 may be a nonpolar organic solvent that has a boiling point that is lower than the condensation temperature of the working fluid employed within the intermediate temperature ORC system 16. According to certain embodiments, the working fluid employed in the ORC system 18 may include cyclohexane. However, in other embodiments, any other suitable low temperature nonpolar organic solvent may be employed, such as propane, butane, isopentane, isobutane, cyclohexane-propane, cyclohexane-butane, cyclopentane-butane, or cyclopentane-pentafluoropropane, among others. In certain embodiments, the working fluid employed in the low temperature ORC system 18 may include a nonpolar organic solvent that has a solubility that is less than or equal to the solubility of cyclohexane, as measured by the Hildebrand solubility parameters. For example, the working fluid may include propane, butane, isobutane, n-pentane, isopentane, isohexane, hexane, or combinations thereof, among others. According to certain embodiments, the ORC system 18 may employ a nonpolar organic solvent with a critical temperature of approximately 100 to 300° C. to facilitate the recovery of waste heat in the temperature range of approximately 150 to 250° C. As may be appreciated the individual working fluids used within each ORC system 14, 16, and 18 may depend on parameters, such as the temperature of the heat source 12 and the size and type of equipment included within the ORC systems, among others.

Each ORC system 14, 16, and 18 includes an integrated power module 20, 22, or 24 that converts heat to electricity. Each integrated power module 20, 22, and 24 includes a turbine 26, 28, or 30 and a generator 32, 34, or 36 contained in a single, unitary housing. According to certain embodiments, the turbine 26, 28, or 30 and the generator 32, 34, or 36 of each integrated power module 20, 22, and 24 may be contained within a hermetically sealed housing without a shaft seal. In these embodiments, no external shaft seals may be employed; however, internal seals may be employed to form a boundary between the high-pressure and low-pressure sides of the turbine. Further, in certain embodiments, the turbines 26, 28, and 30 may include radial turbines, and the generators 32, 34, and 36 may include high speed, permanent magnet generators. However, in other embodiments, other suitable types of turbines and/or generators may be employed. Vapor phase working fluid may enter each integrated power module 20, 22, and 24 and expand as it flows through the turbine 26, 28, or 30 to drive the generator 32, 34, or 36, as discussed further below with respect to FIG. 4. Further, in certain embodiments, a portion of the working fluid may bypass the turbine, flow through the internal seals, and then join with the working fluid exiting the turbine. The bypass working fluid and the working fluid exiting the turbine may provide cooling for the generator.

The high temperature ORC system 14 includes a heat exchanger 38 that transfers heat from the heat source 12 to the working fluid flowing through the heat exchanger 38. According to certain embodiments, the heat exchanger 38 may be designed to directly transfer heat from the heat source 12 to the working fluid. For example, the heat exchanger 38 may be a boiler that receives exhaust gas from the heat source 12 and transfer heat from the exhaust gas to the working fluid flowing through tubes within the heat exchanger 38. In these embodiments, the cooled exhaust gas exiting the heat exchanger 38 may be directed to a vent control system 40 that regulates release of the cooled exhaust gas to the environment. However, in other embodiments, the heat exchanger may be designed to receive an intermediate fluid, such as thermal oil, that has been heated by the heat source 12. In these embodiments, the heat exchanger may be a shell and tube heat exchanger, shell and plate heat exchanger, or the like, that transfers heat from the intermediate fluid to the working fluid flowing through the heat exchanger 38.

Within the heat exchanger 38, the working fluid may absorb heat from the heat source to vaporize the working fluid. In certain embodiments, the working fluid may be heated to a temperature of approximately 400° C. Upon exiting the heat exchanger 38, the vapor phase working fluid may then flow to the integrated power module 20. Within the integrated power module 20, the working fluid may be expanded as it flows through the turbine 26 to drive the generator 32. For example, as the working fluid expands, the working fluid may rotate blades or a wheel of the turbine, which may be coupled to the generator 32. The expanded working fluid may exit the turbine 26 as a low temperature and pressure vapor that flows past and/or through the generator 32 to exit the integrated power module 20.

From the integrated power module 20, the working fluid may enter a heat exchanger 42 as a low temperature and pressure vapor. The heat exchanger 42 circulates the working fluid of the high temperature ORC system 14, as well as the working fluid of the intermediate temperature ORC system 16. Accordingly, the heat exchanger 42 may be a shared heat exchanger that is common to both the high temperature ORC system 14 and the intermediate temperature ORC system 16. Within the heat exchanger 42, the working fluid of the high temperature ORC system 14 may transfer heat to the working fluid of the intermediate temperature ORC system 16 to condense the working fluid of the high temperature ORC system 14 into a liquid. The liquid phase working fluid may then flow through a pump 44 that pressurizes the working fluid and circulates the working fluid within the ORC system 14. From the pump 44, the working fluid may then return to the heat exchanger 38 where the cycle may begin again.

Through the shared heat exchanger 42, the working fluid flowing within the high temperature ORC system 14 may transfer heat to the working fluid flowing within the intermediate temperature ORC system 16. Specifically, as the working fluid of the intermediate temperature ORC system 16 flows through the shared heat exchanger 42, the working fluid of the intermediate temperature ORC system 16 may absorb heat from the working fluid of the high temperature ORC system 14 to vaporize the working fluid of the intermediate ORC system 16. In certain embodiments, the working fluid may be heated to a temperature of approximately 300° C. The vapor phase working fluid may then enter the integrated power module 22 where the working fluid may be expanded as it flows through the turbine 28 to drive the generator 34. The expanded working fluid may exit the turbine 28 as a low temperature and pressure vapor that flows past and/or through the generator 34 to exit the integrated power module 22.

From the integrated power module 22, the working fluid may enter a heat exchanger 46 as a low temperature and pressure vapor. The heat exchanger 46 circulates the working fluid of the intermediate temperature ORC system 16, as well as the working fluid of the low temperature ORC system 18. Accordingly, the heat exchanger 46 may be a shared heat exchanger that is common to both the intermediate temperature ORC system 16 and the low temperature ORC system 18. Within the heat exchanger 46, the working fluid of the intermediate temperature ORC system 16 may transfer heat to the working fluid of the low temperature ORC system 18 to condense the working fluid of the intermediate temperature ORC system 16 into a liquid. The liquid phase working fluid may then flow through a pump 48 that pressurizes the working fluid and circulates the working fluid within the ORC system 16. From the pump 48, the working fluid may then return to the heat exchanger 42 where the cycle may begin again.

Through the shared heat exchanger 46, the working fluid flowing within the intermediate temperature ORC system 16 may transfer heat to the working fluid flowing within the low ORC system 18. Specifically, as the working fluid of the low temperature ORC system 18 flows through the shared heat exchanger 46, the working fluid of the low temperature ORC system 18 may absorb heat from the working fluid of the intermediate temperature ORC system 16 to vaporize the working fluid of the low temperature ORC system 18. In certain embodiments, the working fluid may be heated to a temperature of approximately 200° C. The vapor phase working fluid may then enter the integrated power module 24 where the working fluid may be expanded as it flows through the turbine 30 to drive the generator 36. According to certain embodiments, the temperature of the working fluid entering the integrated power module 24 may be greater than approximately 150° C. to 200° C., and all subranges therebetween. More specifically, the temperature of the working fluid entering the integrated power module 24 may be greater than approximately 150° C. to 180° C., and all subranges therebetween. The expanded working fluid may then exit the turbine 30 as a low temperature and pressure vapor that flows past and/or through the generator 36 to exit the integrated power module 24.

From the integrated power module 24, the working fluid may flow through a heat exchanger 50 where the working fluid may be condensed by a cooling fluid circulated through the heat exchanger 50 by a cooling system 52. According to certain embodiments, the cooling system 52 may circulate a cooling fluid, such as water, to the heat exchanger 50 from a cooling tower or cooling reservoir. Further, in other embodiments, the cooling system 52 may be a cooling system, such as a chilled water system, used in other areas of the process or facility that includes the heat source 12. Moreover, in yet other embodiments, the heat exchanger 50 may be an air-to-liquid heat exchanger and the cooling system 52 may include a fan and motor that draw ambient air across the heat exchanger 50.

The liquid phase working fluid exiting the heat exchanger 50 may then flow through a pump 54 that pressurizes the working fluid and circulates the working fluid within the ORC system 18. From the pump 54, the working fluid may return to the heat exchanger 46 where the cycle may begin again.

The cascade arrangement of the ORC systems 14, 16, and 18 may generally allow an increased amount of heat recovery over a larger temperature range, as compared to non-cascade systems. For example, the high temperature ORC system 14 may allow recovery of heat in higher temperature ranges, such as approximately 350 to 500° C., while the intermediate temperature ORC system 16 may allow recovery of heat in intermediate temperature ranges, such as approximately 250° C. to 350° C. Further, the low temperature ORC system 18 may allow recovery of heat in low to intermediate temperature ranges, such as approximately 150° C. to 250° C. As discussed above, the low temperature ORC system 18 may employ a nonpolar organic solvent as the working fluid to facilitate the recovery of heat in the low to intermediate temperature range. According to certain embodiments, the nonpolar organic solvent may have a critical temperature in the range of approximately 100° C. to 300° C., and may have a solubility that is less than or equal to the solubility of cyclohexane, as measured by the Hildebrand solubility parameters. As may be appreciated, the temperature ranges are provided by way of example, and are not meant to be limiting. In other embodiments, the temperatures existing in each ORC system 14, 16, and 18 may vary depending on factors, such as they type of the heat source provided, the temperature of the heat source 12, and the number of ORC systems included within the waste heat recovery system, among others.

As may be appreciated, additional equipment such as pumps, valves, control circuitry, pressure and/or temperature transducers or switches, among others may be included within the waste heat recovery system 10. For example, each heat exchanger 38, 42, 46, and 50 may include a pressure relief valve or vent. Furthermore, the types of equipment included within the waste heat recovery system 10 may vary. For example, according to certain embodiments, the heat exchangers 38, 42, 46, and 50 may include shell and tube heat exchangers, fin and tube heat exchangers, plate heat exchangers, plate and shell heat exchangers, or combinations thereof, among others. Moreover, in other embodiments, additional ORC systems may be included within the waste heat recovery system to allow the recovery of waste heat at additional temperatures. Further, in certain embodiments, any number of ORC systems, such as 2, 3, 4, 5, or more ORC systems, may be arranged in a cascade configuration.

Figure 2:
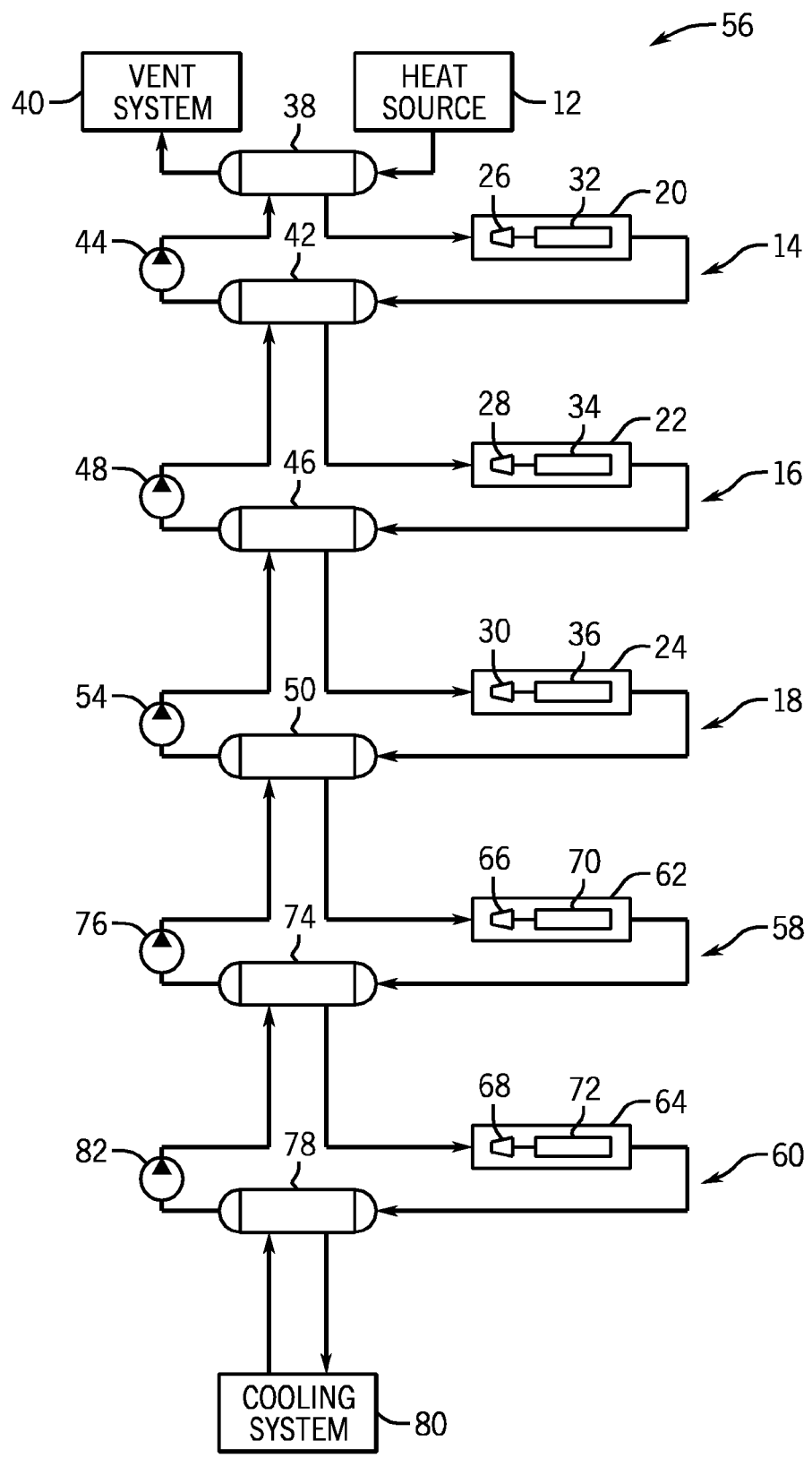
FIG. 2 is a diagrammatical representation of another embodiment of a waste heat recovery system.

FIG. 2 depicts another embodiment of a waste heat recovery system 56. The waste heat recovery system 56 may be generally similar to the waste heat recovery system 10 described above with respect to FIG. 1. However, rather than including three ORC systems as shown in FIG. 1, the waste heat recovery system 56 includes five ORC systems that allow the recovery of heat in additional temperature ranges.

The waste heat recovery system 56 includes the ORC systems 14, 16, and 18, which may operate in a manner generally similar to that described above with respect to FIG. 1. Further, the waste heat recovery system 56 includes two additional ORC systems 58 and 60 that allow the recovery of heat in additional temperature ranges. For example, the ORC system 58 may allow recovery of heat in lower temperature ranges, such as approximately 100° C. to 150° C., while the ORC system 60 may facilitate recovery of heat in even lower temperature ranges, such as approximately 50° C. to 100° C.

The working fluid employed in the ORC system 58 may be a lower temperature nonpolar organic working fluid, as compared to the working fluids employed in the ORC systems 14, 16, and 18. For example, the working fluid employed within the ORC system 58 may be a nonpolar organic solvent that has a boiling point that is lower than the condensation temperature of the working fluid employed within the low temperature ORC system 18. According to certain embodiments, the working fluid employed in the ORC system 58 may include butane, propane, or other nonpolar organic solvents that have a solubility that is less than or equal to the solubility of cyclohexane, as measured by the Hildebrand solubility parameters.

The working fluid employed in the ORC system 60 may be a lower temperature nonpolar organic working fluid, as compared to the working fluids employed in the ORC systems 14, 16, 18, and 58. For example, the working fluid employed within the ORC system 60 may be a nonpolar organic working fluid that has a boiling point that is lower than the condensation temperature of the working fluid employed within the low temperature ORC system 58. According to certain embodiments, the working fluid employed in the ORC system 60 may include R245ca, R245fa, R134a, R123, or R236fa, among others.

Each ORC system 58 and 60 includes an integrated power module 62 or 64 that converts heat to electricity, in a manner similar to that described above with respect to the integrated power modules 20, 22, and 24 (FIG. 1). Each integrated power module 60 and 62 includes a turbine 66 or 68 and a generator 70 or 72 contained in a single, unitary housing. According to certain embodiments, the turbines 66 and 68 may include radial turbines, and the generators 70 and 72 may include high speed, permanent magnet generators. However, in other embodiments, other suitable types of turbines and/or generators may be employed.

The ORC system 58 receives heat from the ORC system 18 through the shared heat exchanger 50. In particular, within the heat exchanger 50, the working fluid of the ORC system 18 may transfer heat to the working fluid flowing within the ORC system 58. Accordingly, in the embodiment shown in FIG. 2, the working fluid of the ORC system 18 is condensed by transferring heat to the working fluid of the ORC system 58, rather than by transferring heat to a cooling fluid as shown in FIG. 1. Further, as the working fluid of the ORC system 58 absorbs heat from the working fluid of the ORC system 18, the working fluid of the ORC system 58 is vaporized. In certain embodiments, the working fluid may be heated to a temperature of approximately 150° C. The vapor phase working fluid may then enter the integrated power module 62 where the working fluid may be expanded as it flows through the turbine 66 to drive the generator 70. The expanded working fluid may exit the turbine 66 as a low temperature and pressure vapor that flows past and/or through the generator 70 to exit the integrated power module 62.

From the integrated power module 62, the working fluid may enter a heat exchanger 74 as a low temperature and pressure vapor. The heat exchanger 74 circulates the working fluid from the ORC system 58, as well as the working fluid from the ORC system 60. Accordingly, the heat exchanger 74 may be a shared heat exchanger that is common to both the ORC system 58 and the ORC system 60. Within the heat exchanger 74, the working fluid of the ORC system 58 may transfer heat to the working fluid of the lowest temperature ORC system 60 to condense the working fluid of the ORC system 58 into a liquid. The liquid phase working fluid may then flow through a pump 76 that pressurizes the working fluid and circulates the working fluid within the ORC system 58. From the pump 76, the working fluid may return to the heat exchanger 50 where the cycle may begin again.

Through the shared heat exchanger 74, the working fluid flowing within the ORC system 58 may transfer heat to the working fluid flowing within the lowest temperature ORC system 60. Specifically, as the working fluid of the lowest temperature ORC system 60 flows through the shared heat exchanger 74, the working fluid of the lowest temperature ORC system 60 may absorb heat from the working fluid of the ORC system 58 to vaporize the working fluid of the lowest temperature ORC system 60. In certain embodiments, the working fluid may be heated to a temperature of approximately 100° C. The vapor phase working fluid may then enter the integrated power module 64 where the working fluid may be expanded as it flows through the turbine 68 to drive the generator 72. The expanded working fluid may exit the turbine 68 as a low temperature and pressure vapor that flows past and/or through the generator 72 to exit the integrated power module 64.

From the integrated power module 64, the working fluid may flow through a heat exchanger 78 where the working fluid may be condensed by a cooling fluid that is circulated through the heat exchanger 78 by a cooling system 80. According to certain embodiments, the cooling system 80 may circulate a cooling fluid, such as water, to the heat exchanger 78 from a cooling tower or cooling reservoir. Further, in other embodiments, the cooling system 80 may be a cooling system, such as a chilled water system, used in other areas of the process or facility that includes the heat source 12. Moreover, in yet other embodiments, the heat exchanger 78 may be an air-to-liquid heat exchanger and the cooling system 80 may include a fan and motor that draw ambient air across the heat exchanger 78.

The liquid phase working fluid exiting the heat exchanger 78 may then flow through a pump 82 that pressurizes the working fluid and circulates the working fluid within the ORC system 60. From the pump 82, the working fluid may return to the heat exchanger 74 where the cycle may begin again.

Figure 3:
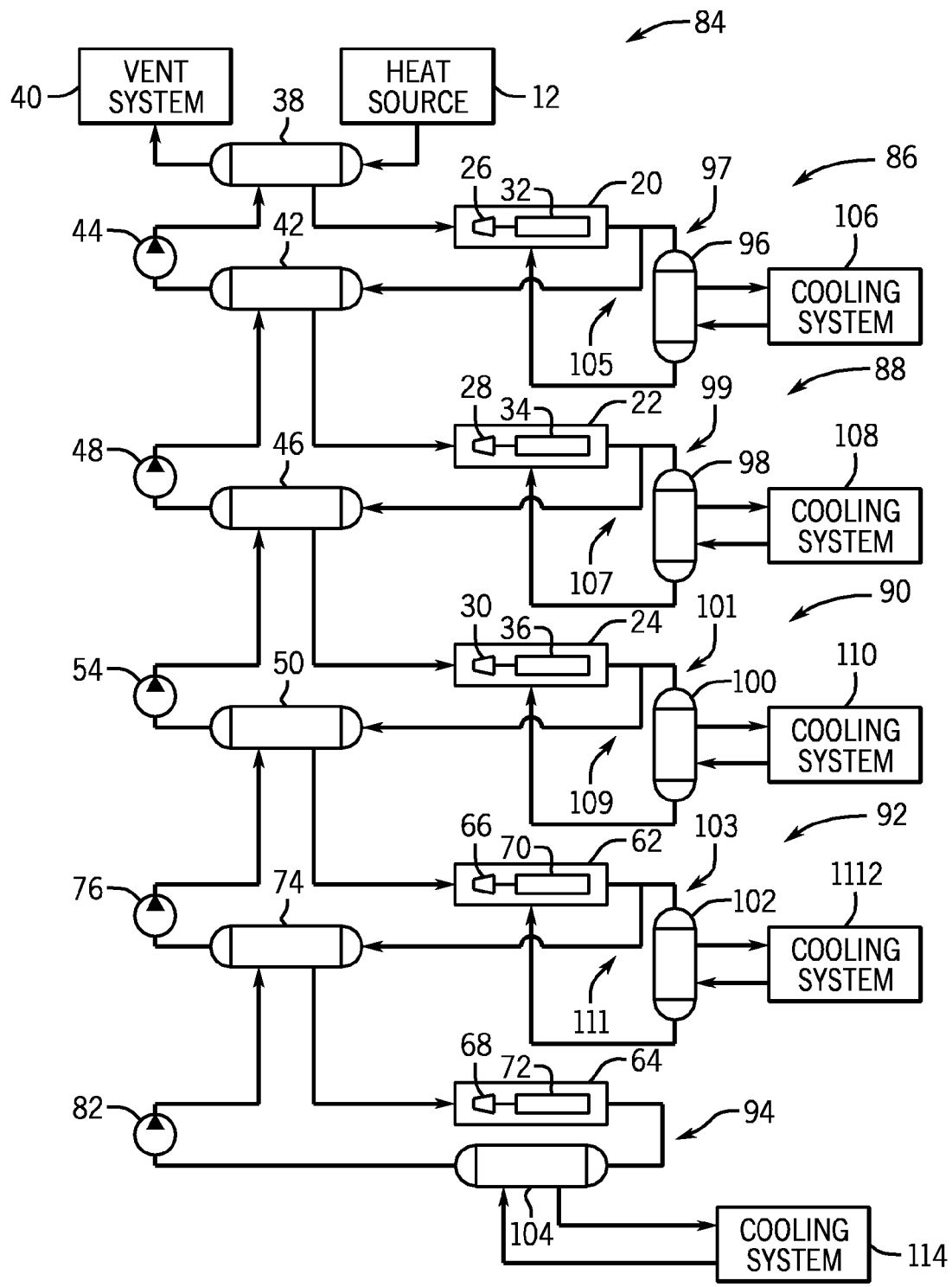
FIG. 3 is a diagrammatical representation of a further embodiment of a waste heat recovery system.

FIG. 3 depicts another embodiment of a waste heat recovery system 84. The waste heat recovery system 84 includes five ORC systems 86, 88, 90, 92, and 94 that operate in a manner generally similar to the ORC systems 14, 16, 18, 58, and 60 that are described above with respect to FIG. 2. However, the ORC systems 86, 88, 90 and 92 each may include an additional heat exchanger 96, 98, 100, and 102 disposed downstream of the integrated power module 20, 22, 24, or 62. The additional heat exchangers 96, 98, 100, and 102 also may be disposed upstream of the shared heat exchangers 42, 46, 50, and 74. The lowest temperature ORC system 94 also includes a heat exchanger 104 with a cooling system 114 designed to condense the working fluid flowing through the heat exchanger 104, in a manner similar to the cooling system 80, described above with respect to FIG. 2.

Each of the additional heat exchangers 96, 98, 100, and 102 may be designed to cool a portion 97, 99, 101, and 103 of the working fluid exiting the integrated power module 20, 22, 24, and 62. For example, within each ORC system 86, 88, 90, and 92, the working fluid exiting the integrated power module 20, 22, 24, and 62 may be split into a first portion 105, 107, 109, or 111 that is directed to the shared heat exchanger 42, 46, 50, or 74, and a second portion 97, 99, 101, or 103 that is directed to the additional heat exchanger 96, 98, 100 or 102. Each additional heat exchanger 96, 98, 100, or 102 circulates a cooling fluid from a cooling system 106, 108, 110, or 112 to cool the portion 97, 99, 101, or 103 of the working fluid. As shown in FIG. 3, the cooling systems 106, 108, 110, and 112 are separate cooling systems. However, in other embodiments, two or more of the cooling systems 106, 108, 110, and 112 may be part of a larger overall cooling system that provides cooling fluid to multiple heat exchangers 96, 98, 100, and 102. According to certain embodiments, the cooling systems 106, 108, 110, and 112 may be designed to cool the portion 97, 99, 101, or 103 of the working fluid by at least approximately 10-30° C., and all subranges therebetween.

The cooled portion 97, 99, 101, or 103 of the working fluid may then be directed to the integrated power module 20, 22, 24, or 62 to provide additional cooling for components of the generator 32, 34, 36, or 70, such as the windings and/or magnetic bearings, among others. Further, in certain embodiments, the cooled portion 97, 99, 101, or 103 of the working fluid may be designed to inhibit flow of the hotter working fluid exiting the turbine 26, 28, 30, or 66 towards certain components of the generator 32, 34, 36, or 70. Within the integrated power module 20, 22, 24, or 62, the cooled portion 97, 99, 101, or 103 of the working fluid may combine with the working fluid exiting the turbine 26, 28, 30, or 36 to form a single flow of working fluid that exits the integrated power module 20, 22, 24, or 62.

As shown in FIG. 3, the ORC systems 86, 88, 90, and 92 each include an additional heat exchanger 96, 98, 100, or 102 and cooling system 106, 108, 110, or 112. However, in other embodiments, one or more of the additional heat exchangers 96, 98, 100, or 102 and cooling systems 106, 108, 110, or 112 may be omitted. Further, in certain embodiments, the ORC system 94 may include an additional heat exchanger and associated cooling system designed to cool a portion of the working fluid that exits the integrated power module 64.

Figure 4:
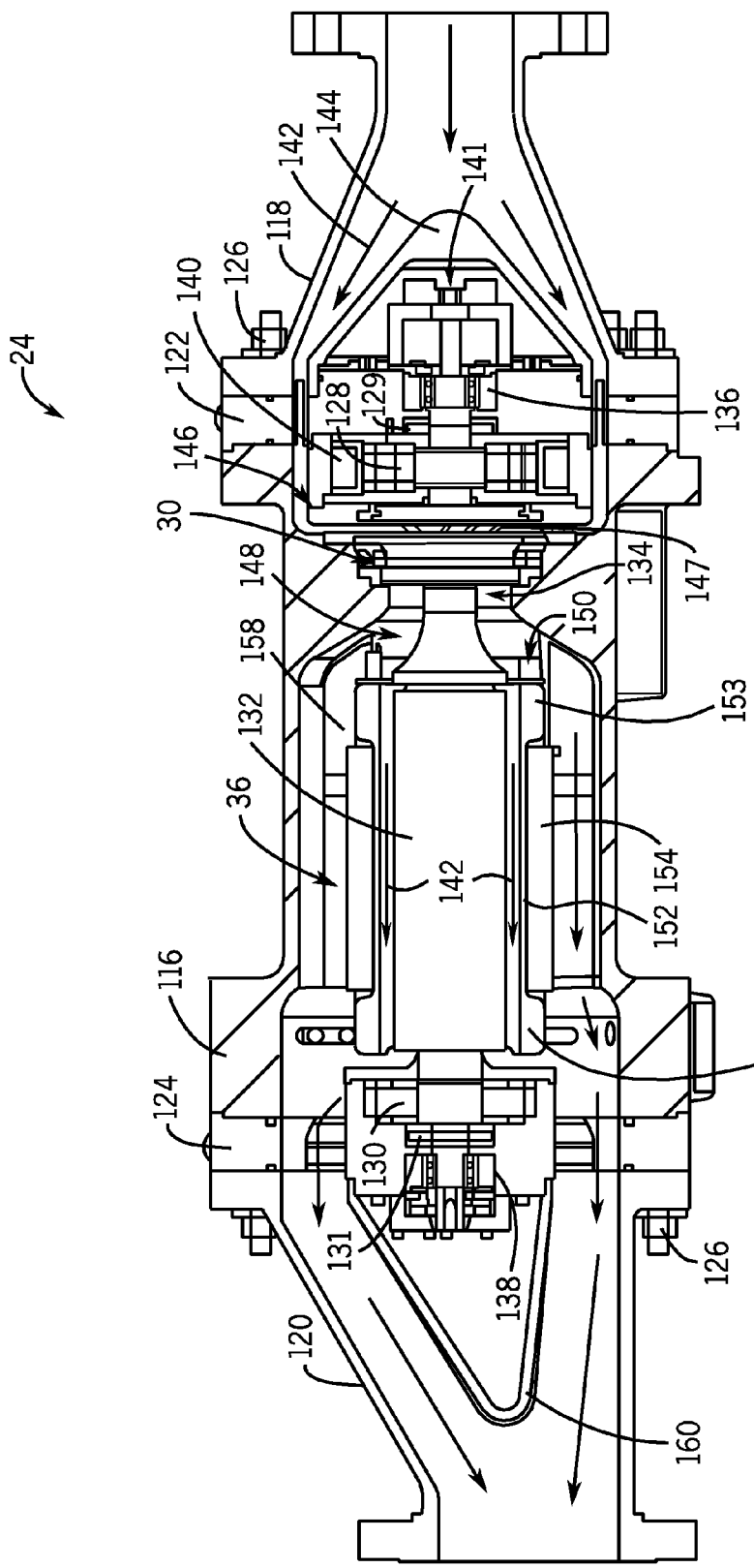
FIG. 4 is a cross-sectional view of an embodiment of an integrated power module that may be employed in the waste heat recovery systems of FIG. 1, FIG. 2, and FIG. 3.

FIG. 4 depicts an embodiment of the integrated power module 24 that may be employed in the ORC system 18. Although the integrated power module shown in FIG. 4 is described herein in the context of the integrated power module 24 employed in the ORC system 18, one or more of the other integrated power modules 20, 22, 62, and 64 may employ a similar design. Accordingly, the integrated power module shown in FIG. 4 may be employed in one or more of the other ORC systems 14, 16, 58, 60, 86, 88, 90, 92, and 94.

The integrated power module 24 includes the turbine 30 and the generator 36, described above with respect to FIG. 1, which are disposed within a casing 116. An inlet conduit 118 and an outlet conduit 120 are coupled to the casing 116 to direct the working fluid into and out of the integrated power module 24, respectively. A bearing frame 122 may be mounted between the inlet conduit 118 and the casing 116 and affixed by fasteners 126 that may extend through the inlet conduit 118, the bearing frame 122, and the casing 116. Similarly, a bearing frame 124 may be mounted between the outlet conduit 120 and the casing 116 and affixed by fasteners 126 that may extend through the outlet conduit 120, the bearing frame 124, and the casing 116.

Radial magnetic bearings 128 and 130 may be mounted on the bearing frames 122 and 124 to rotatably support the turbine 30 and a rotor 132 of the generator 36 within the casing 116. For example, the radial magnetic bearings 128 and 130 may support a shaft 134 that couples the turbine 30 to the high-speed permanent magnet (PM) rotor 132. Radial sensor assemblies 129 and 131 may be employed to detect the radial position of the PM rotor 132. The bearing frames 122 and 124 also may support backup bearings 136 and 138 that may be employed to support the shaft 134 when the radial magnetic bearings 128 and 130 are unavailable, for example, due to a power outage. Further, the bearing frame 122 also may support axial bearings 140 that support the turbine 30 and rotor 132 in the axial direction. A sensor assembly 141 may be employed to detect the axial position of the rotor 132. As shown in FIG. 4, the bearings 128, 130, and 140 may include magnetic bearings. However, in other embodiments, the bearings 128 and 130 may include ball bearings, needle bearings, or journal bearings, among others.

The vapor phase working fluid may enter the integrated power module 24 through the inlet conduit 118 and may flow through the integrated power module 24 as generally indicated by arrows 142. According to certain embodiments, the working fluid may enter the integrated power module 24 at a temperature greater than approximately 150° C. to 180° C., and all subranges therebetween, and a pressure greater than or equal to approximately 8 bar. A diverter cone 144 may be disposed within the inlet conduit 118 to direct the working fluid through an inducer channel 146 to the turbine 30. The vapor phase working fluid may expand as it flows through the turbine 30, which in turn may rotate a wheel 147 of the turbine 30. The expanded working fluid may then exit the turbine 30 and flow through an exhaust conduit 148 towards the generator 36. According to certain embodiments, the working fluid exiting the turbine 30 may have a temperature greater than approximately 130 to 150° C., and all subranges therebetween, and a pressure greater than or equal to approximately 2 bar.

As disclosed above, the turbine 30 may be coupled to the generator 36, for example, by the shaft 134. Accordingly, as the turbine wheel 147 rotates, the PM rotor 132 of the generator 36 rotates synchronously to drive the generator 136. For example, permanent magnets disposed within the rotor 132 may rotate along with the rotor 132 within a stator 150 that includes magnetic windings 152 to generate electricity. End turns 153 (e.g., end windings), which are portions of the windings 152, may extend beyond the stator 150. The stator 150 may be disposed circumferentially about the rotor 132, and may generally encircle the rotor 132. According to certain embodiments, the electricity produced by the generator 36 may be transferred to an electronics package disposed outside of the casing 116 to produce electrical power. The electrical power may be AC or DC power that may be employed to power a standalone machine or facility or that may be provided to a power grid. According to certain embodiments, approximately 1 to 300 kW of power may be produced by the integrated power module 24.

The generator 36 also includes a stator casing 154, such as a laminate stack, that can be employed to mount the windings 152 within the stator 150. As discussed further below with respect to FIG. 6, the casing 154 may include slots for receiving the windings 152 within the stator 150. Further, the casing 154 may enclose outer portions of the generator 36. The working fluid may flow along the casing 154 within the casing 116 of the integrated power module 124 to provide cooling for the generator 36. Further, the working fluid may flow through the generator between the stator 150 and the rotor 132. In particular, the working fluid may flow between the rotor 132 and the windings 152. Moreover, in certain embodiments, in addition to receiving flow of the working fluid from the turbine 30, the generator 36 may receive working fluid diverted from another portion of the ORC system 18. For example, in certain embodiments, a portion of the working fluid exiting the heat exchanger 50 (e.g., between heat the exchanger 50 and the pump 54 or between the pump 54 and the heat exchanger 46) may be directed to the generator 36 to provide cooling and/or sealing. In these embodiments, the protective coatings described herein also may be designed to withstand exposure to the organic working fluid diverted to the generator 36 from another part of the ORC system 18.

According to certain embodiments, the temperature of the working fluid within the integrated power module 24 may range from approximately 130° C. to 250° C., or more specifically between approximately 145° C. and 180° C., and all subranges therebetween. At these elevated temperatures, the nonpolar organic solvents that are employed in the ORC system 18 may degrade components of the generator 36, such as the electrical windings 152. Accordingly, as discussed further below with respect to FIGS. 6-15, the electrical windings 152 may be varnished and/or encapsulated to inhibit contact of the working fluid with the windings 152. Further, the protective coating may be disposed between the windings 152 and/or within slots of the casing 154 to provide insulation and inhibit vibration, in addition to inhibiting contact of the working fluid with the windings 152. According to certain embodiments, the end turns 153 may be disposed within the hottest portion of the integrated power module 24, and, in certain embodiments, the working fluid may flow past the end turns 153 at temperatures of approximately 180° C. to 200° C., and all subranges therebetween. Accordingly, the end windings 153 may be varnished and/or encapsulated to inhibit contact of the working fluid with the end turns 153. Moreover, other components within the integrated power module also may be varnished and/or encapsulated. For example, as discussed further below, actuators of the radial magnetic bearings 128 and 130, thrust coils of the axial bearings 140, or portions of the sensor assemblies 129, 131, and 141 may be varnished and/or encapsulated with a protective coating to inhibit contact of the working fluid with these components.

In addition to flowing through the generator 36, the working fluid may be directed between the generator and the casing 116 by fins 158 that may be disposed along the interior of the casing 116. The fins may direct the working fluid towards the outlet conduit 120. A diverter cone 160 may be included within the outlet conduit 120 to direct the working fluid towards the exit of the integrated power module 24.

As described below with respect to FIGS. 5-9, one or more components employed in the integrated power modules 20, 22, 24, 62, and 64 may be impregnated with a protective varnish that resists the hot working fluid to inhibit contact of the working fluid with the components. Although components of any of the integrated power modules 20, 22, 24, 62, and 64 may be varnished, the varnishing techniques described herein may be particularly well-suited to protecting components disposed within integrated power modules that receive nonpolar organic working fluids, such as toluene or cyclohexane, at elevated temperatures of approximately 150° C. to 250° C.

Figure 5:
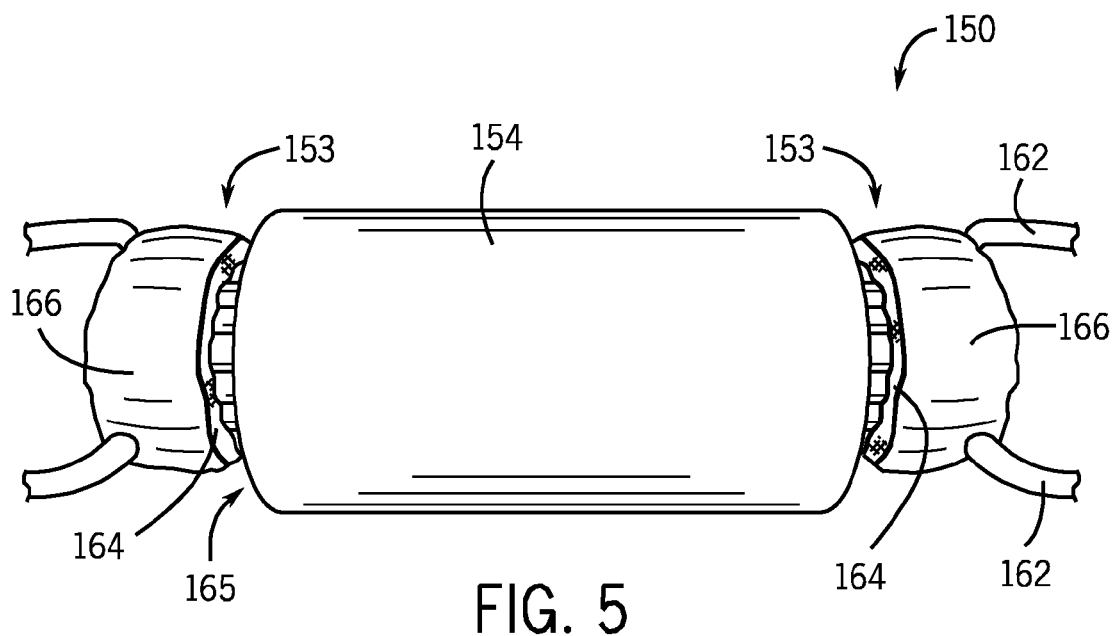
FIG. 5 is a top view of an embodiment of a varnished stator that may be employed in the integrated power module of FIG. 4.
Figure 6:
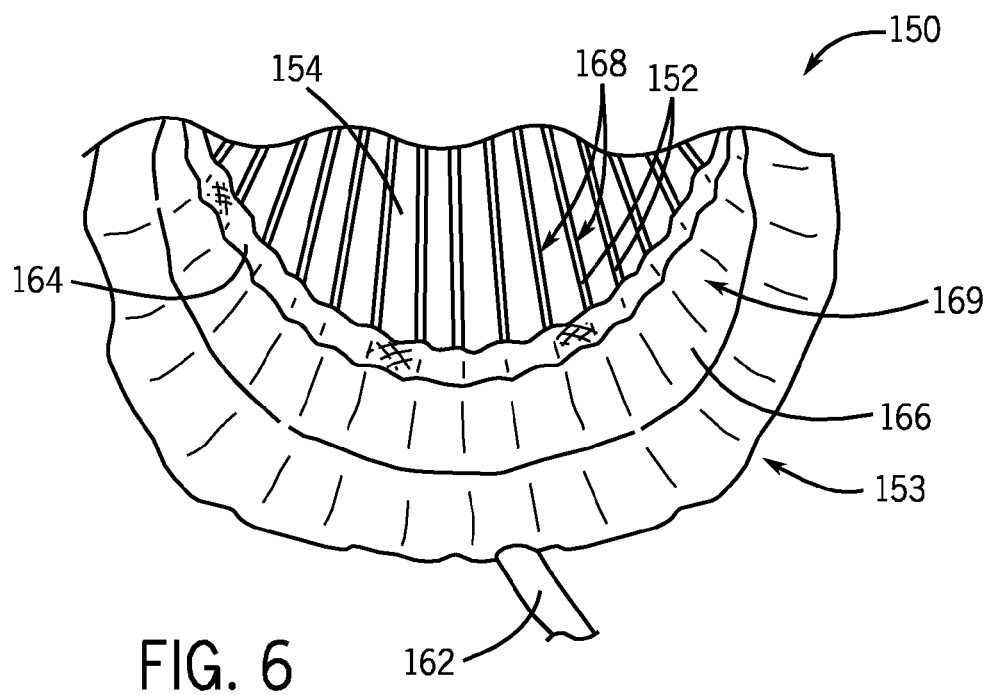
FIG. 6 is a side perspective view of a portion of the varnished stator of FIG. 5 depicting the interior of an end turn.

FIGS. 5 and 6 depict an embodiment of a stator 150 that has been varnished. As shown in FIG. 5, the winding end turns 153 extend from opposite ends of the stator casing 154. Lead wires 162, which may be insulated with tubing, extend from an end turn 153 and may extend through the casing 116 (FIG. 4). The end turns 153 may be wrapped with a cloth 164, such as an electrical grade fiberglass cloth, and impregnated with a varnish 166. According to certain embodiments, the windings 152 (FIG. 6) that extend beyond end surfaces 165 of the stator casing 154 may be wrapped in the cloth 164. The varnish 166 may then be applied to the cloth 164, as discussed further below with respect to FIG. 9. However, in other embodiments, the cloth 164 may be omitted and the varnish 166 may be applied directly to the windings 152. As shown in FIG. 5, the exterior surfaces of the end turns 153 that extend beyond the stator casing 154 may be varnished.

FIG. 6 is a side perspective view of the stator 150 depicting the interior end of the stator 150 as viewed through the right end turn 153. As shown in FIG. 6, the interior surfaces of the end turns 153 also may be varnished. For example, the varnish 166 may be disposed on the cloth 164 that wraps around the end turns 153. Further, the windings 152 that extend within the interior opening 169 of the stator casing 154 also may be varnished. For example, the windings 152 may be disposed within slots 168 in the interior surface of the stator casing 154. In certain embodiments, the varnish 166 may bind the windings 152 within the slots 168 to inhibit vibration and coil abrasion. For example, the varnish 166 may be disposed around the windings 152 within the slots 168, and between the windings 152 and the interior surfaces of the slots 168, to secure the windings 152 within the slots 168.

Figure 7:
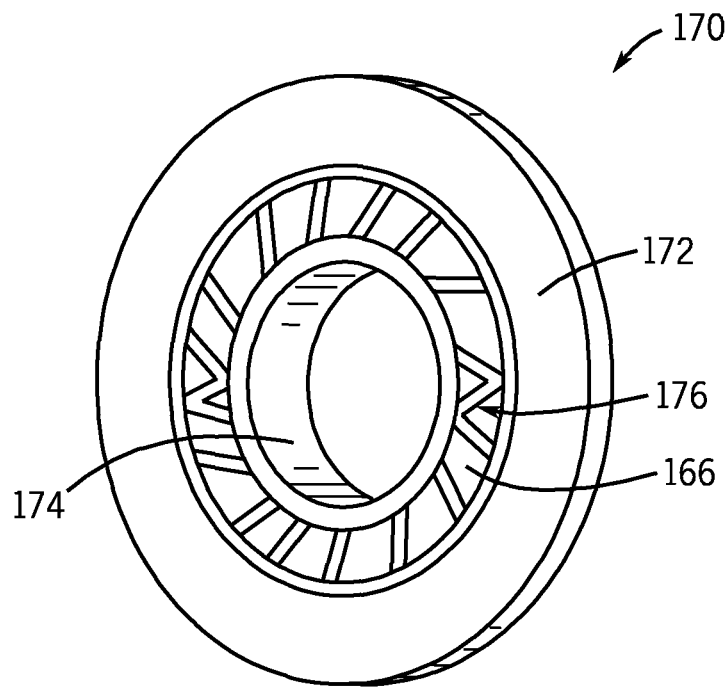
FIG. 7 is a perspective view of an embodiment of a varnished magnetic bearing actuator that may be employed in the integrated power module of FIG. 4.

FIG. 7 depicts an embodiment of another integrated power module component that may be varnished. In particular, FIG. 7 depicts a bearing actuator 170 that may be part of a radial magnetic bearing 128 or 130. The bearing actuator 170 includes a bearing stator 172 that may be disposed around a rotor (not shown) of the bearing 128 or 130. The bearing actuator 170 also includes an inner ring 174 that supports electromagnetic coils 176, which may include copper wires insulated with a high temperature and pulse endurance insulating film of an approximately 2 mil (0.0002 inch) build. For example, the electromagnetic coils 176 may be wrapped around slots of the inner ring 174. The varnish 166 may be applied to the electromagnetic coils 176 to inhibit contact between the coils 176 and the working fluid. Further, in certain embodiments, the varnish 166 may bind the coils 176 within slots of the inner ring 174 to inhibit vibration and coil abrasion.

Figure 8:
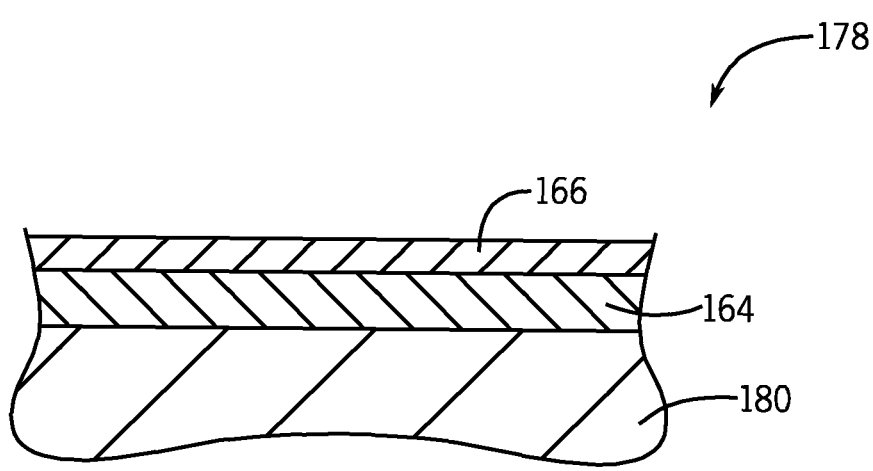
FIG. 8 is a cross-sectional view of an embodiment of a varnished component that may be employed in the integrated power module of FIG. 4.

FIG. 8 is a cross-sectional view of an embodiment of a varnished component 178. The varnished component 178 includes an integrated power module component 180 that has been wrapped in cloth 164 and impregnated with varnish 166. According to certain embodiments, the component 180 may include stator windings 152. In these embodiments, the component 180 may include copper wire coated with high-temperature, pulse-endurance enamels, such as, but not limited to, a nanocomposite polyamide-imide and polyester combination or a nanocomposite polyamide-imide and polyesteramide combination. In certain embodiments, for example, where the component 180 includes windings of an end turn 153, the component 180 may be wrapped in cloth 164, which in certain embodiments, may be an electrical grade fiberglass cloth. However, in other embodiments, the cloth 164 may be omitted and the varnish 166 may be disposed directly on the component 180 through impregnation or vacuum-impregnation. In other embodiments, the component 180 may include electromagnetic coils 176 of a bearing actuator 170. Further, in yet other embodiments, the component may include a thrust coil of an actuator for an axial magnetic bearing 140 (FIG. 4), a component of a sensor assembly 129, 131, or 141, or another suitable component of an integrated power module that is exposed to a nonpolar organic working fluid at an elevated temperature.

The varnish 166 may be a high performance aromatic epoxy compound that is vacuum impregnable and compatible with nonpolar organic working fluids, such as toluene and/or cyclohexane, at elevated temperatures of approximately 100° C. to 300° C., or more specifically, approximately 150° C. to 250° C. For example, the varnish 166 may include an epoxy resin, a reactive diluent, and a catalyst. The epoxy resin may have single or multiple aromatic rings in its backbone and may be epoxidized with epichlorohydrin or an epichlorohydrin derivative. For example, the epoxy resin may be epoxidized with a phenol formaldehyde resin, such as a Novolac resin or phenolic resin. In certain embodiments, the Novolac resin may have 3-7 repeating units, an equivalent weight of approximately 176-210 mol/equivalent, and an average functionality of 2-4. According to certain embodiments, the epoxy resin may be a Bisphenol A or Bisphenol F based benzoxazine epoxidized resin built on substituted alkyl phenol resin molecules (e.g., a cresol formaldehyde phenolic-epoxy resin), or built on phenol formaldehyde Novolac epoxy resin molecules.

In certain embodiments, the varnish 166 may include at least approximately 50% by weight of epoxy resin, at least approximately 10% by weight of epichlorohydrin or an epichlorohydrin derivative, at least approximately 15% by weight of a reactive diluent, and less than approximately 10% by weight of catalyst. For example, the varnish may include approximately 50-70% by weight of epoxy resin, and all subranges therebetween; approximately 10-20% by weight of epichlorohydrin or an epichlorohydrin derivative, and all subranges therebetween; approximately 15-30% by weight of a reactive diluent, and all subranges therebetween; and approximately 1-10% by weight of catalyst, and all subranges therebetween. Further, in other embodiments, the epoxy resin may include Araldite® MT 35600 or Araldite® MT 35700, commercially available from Huntsman Corporation of Salt Lake City, Utah.

The reactive diluent may be included in the varnish 166 to adjust the viscosity to approximately 400-4000 centipoise (cps), and all subranges therebetween, at the manufacturing or impregnating temperature to facilitate varnishing. More specifically, the varnish 166 may have a viscosity of approximately 400-2000 cps, and all subranges therebetween.

According to certain embodiments, the reactive diluent may include butyl glycidyl ether, p-t-butyl phenyl glycidyl ether, cresyl glycidyl ether, or vinyl toluene, among others. Further, in certain embodiments, the varnish 166 may include approximately 20-30% by weight of the reactive diluent, and all subranges therebetween. The catalysts may include a secondary amine, a tertiary amine, or imidazoles or their polymeric derivatives, among other components that have desirable onset curing temperatures compatible with the manufacturing conditions. Further, the catalyst may be stable at room temperatures and may be triggered for crosslinking at certain curing temperatures, such as approximately 120° C. to 130° C.

The varnish 166 may be designed to resist corrosion by nonpolar organic working fluids at elevated temperatures of approximately 150° C. to 250° C. For example, the varnish 166 may have a shore durometer (i.e. shore D) hardness of greater than or equal to 90, 91, 92, 93, or 94, as measured by ASTM D2240-05 (2010) prior to exposure to the organic working fluid. Further, the varnish 166 may have a shore durometer hard hardness of greater than or equal to 85, 86, 87, 88, 89, 90, 91, 92, or 93, as measured by ASTM D2240-05 (2010) after exposure for at least approximately 168 hours to an organic working fluid, such as cyclohexane, at temperatures of approximately 180° C. In another example, the varnish 166 may have a shore durometer hard hardness of greater than or equal to 85, 86, 87, 88, 89, 90, 91, 92, or 93, as measured by ASTM D2240-05 (2010) after exposure for at least approximately 168 hours to an organic working fluid, such as cyclohexane, at temperatures of approximately 205° C. Further, the varnish 166 may have a shore durometer hard hardness of greater than or equal to 85, 86, 87, 88, 89, 90, 91, 92, or 93, as measured by ASTM D2240-05 (2010) after exposure for at least approximately 168 hours to an organic working fluid, such as cyclohexane, at temperatures of approximately 230° C.

Moreover, the varnish 166 may have a twisted coil bonding strength of at least approximately 50, 60, 70, 80, or 90 lbs as measured by ASTM D4482-11 prior to exposure to the organic working fluid. Further, the varnish 166 may have a twisted coil bonding strength of at least approximately 50, 60, 70, 80, or 90 lbs as measured by ASTM D4482-11 after exposure for at least approximately 168 hours to a nonpolar organic working fluid, such as cyclohexane, at approximately 180° C. In another example, the varnish 166 may have a twisted coil bonding strength of at least approximately 50, 60, 70, 80, or 90 lbs as measured by ASTM D4482-11 after exposure for at least approximately 168 hours to a nonpolar organic working fluid, such as cyclohexane, at approximately 205° C. Further, the varnish 166 may have a twisted coil bonding strength of at least approximately 50, 60, 70, 80, or 90 lbs as measured by ASTM D4482-11 after exposure for at least approximately 168 hours to a nonpolar organic working fluid, such as cyclohexane, at approximately 230° C.

The varnish 166 also may be designed to withstand at least 12 cycles of thermal cycling from approximately −20° C. to 165° C. without exhibiting visual cracks. More specifically, the varnish 166 may be designed to withstand at least 25 cycles of thermal cycling from −20° C. to 165° C. without exhibiting visual cracks. Moreover, the volatile content of the varnish 166 that is extractable by the nonpolar organic working fluid may be less than or equal approximately 4% by weight. The varnish 166 also may have a glass transition temperature of at least approximately 135° C., or more specifically, at least approximately 150° C. Further, the varnish 166 may be designed to have a thermal endurance of at least 40,000 hours when exposed to the nonpolar organic working fluid at approximately 150° C. in an accelerated life test using Arrhenius extrapolation.

Figure 9:
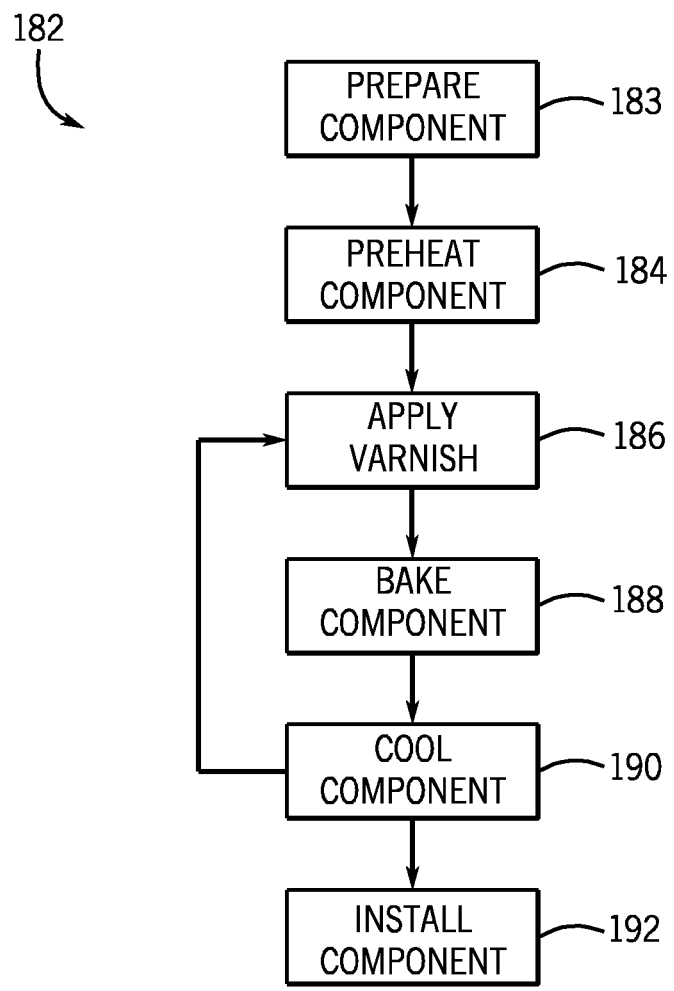
FIG. 9 is a flowchart depicting an embodiment of a manufacturing method for varnishing an integrated power module component.

FIG. 9 is a flowchart depicting a method 182 for varnishing a component that may be employed within an integrated power module. For example, the method 182 may be employed to varnish the stator 150, the bearings 128, 130, or 140, or the sensor assemblies 129, 131, or 141, separately or together, as shown in FIG. 4. The method 182 may begin by preparing (block 183) the component. For example, in certain embodiments where the component includes stator windings or magnetic bearing windings, the component may be wrapped with cloth. However, in other embodiments, no preparation may be needed and block 183 may be omitted.

The method may then continue by preheating (block 184) the component. For example, the component may be preheated in an oven to temperatures of approximately 70° C. to 130° C. to remove moisture from the component. After preheating, the varnish may be applied (block 186) to the component. For example, the component may be submerged in a bath of the varnish for approximately 30 minutes to impregnate the component with varnish. According to certain embodiments, the component may be submerged by at least 0.25 inches below the surface of the varnish bath. The component may then be baked (block 188) to cure the varnish. For example, the component may be heated in gradual steps in an oven for at least approximately 3 hours to reach a temperature of approximately 160° C. Further, in certain embodiments, the initial curing step may be followed by a post-curing step. For example, the component may be cured for approximately 4-12 hours at a temperature of approximately 120° C. to 130° C. In certain embodiments, the component may be rotated to different positions during the curing process. The component may then be removed from the oven and allowed to cool (block 190). For example, the component may be cooled in a series of declining temperature steps until the component reaches a temperature of less than approximately 60° C. As may be appreciated, the curing process, curing temperatures, curing times and/or cooling process, temperatures, and times may vary based on factors such as the type of varnish employed and the size of the component, among others. If additional coats of varnish are desired to provide a thicker coating, blocks 186, 188, and 190 may be repeated until the desired thickness is achieved. The varnished component may then be installed (block 192) within an integrated power module.

As described below with respect to FIGS. 10-15, one or more components employed in the integrated power modules 20, 22, 24, 62, and 64 also may be encapsulated with a thick, protective encapsulating layer to inhibit contact of the working fluid with the components. Although components of any of the integrated power modules 20, 22, 24, 62, and 64 may be encapsulated, the encapsulating techniques described herein may be particularly well-suited to protecting components disposed within integrated power modules that are exposed to nonpolar organic working fluids, such as toluene or cyclohexane, at elevated temperatures of approximately 150° C. to 250° C. In certain embodiments, the components may be varnished, as described above with respect to FIGS. 5-9, prior to encapsulation. However, in other embodiments, the components may be encapsulated without varnishing the components.

Figure 10:
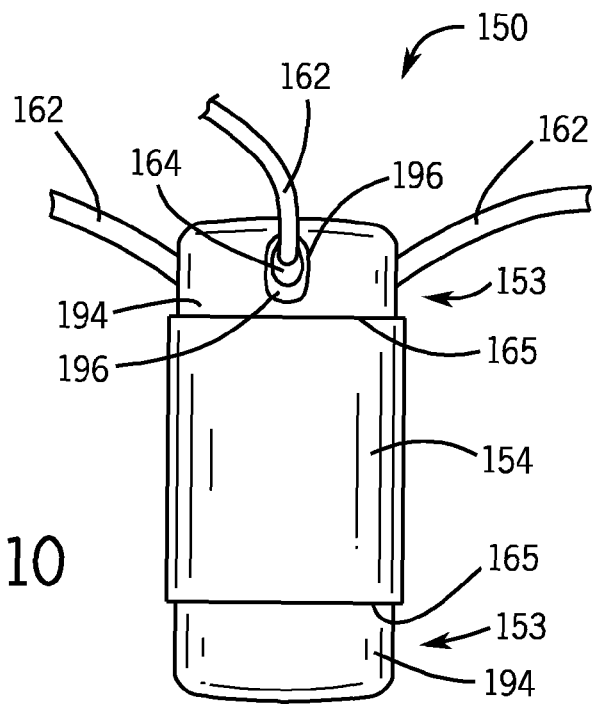
FIG. 10 is a side view of an embodiment of an encapsulated stator that may be employed in the integrated power module of FIG. 4.
Figure 11:
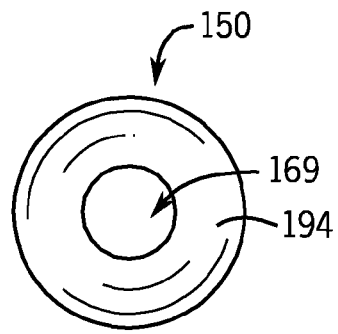
FIG. 11 is a top view of the encapsulated stator of FIG. 10.

FIGS. 10 and 11 depict an embodiment of a stator 150 that has been encapsulated. As shown in FIG. 10, the end turns 153 have been encapsulated with an encapsulant 194. Openings 196 in the encapsulant 194 may allow the lead wires 164 to extend from the end turn 153. The encapsulant 194 may be disposed on the interior and exterior surfaces of the end turns 153 and may abut the end surfaces 165 of the stator casing 154. For example, in certain embodiments, the stator 150 may be placed in a mold and the encapsulant 194 may be injected into the interior of the stator 150 and towards the exterior surfaces of the stator 150 to allow the encapsulant 194 to surround the end turns 153. As shown in FIG. 11, which is a top view of the stator 150, the encapsulant 194 may form a ring around the end turn 153 to allow access to the opening 169 that extends longitudinally through the stator 150 to receive a rotor. In certain embodiments, the windings 152 of the stator 150 may be varnished prior to encapsulation and/or wrapped with cloth 164 prior to encapsulation, as described above with respect to FIGS. 5 and 6. However, in other embodiments, the encapsulant 194 may be injected directly onto the windings 152, or may disposed directly on cloth 164 that may be wrapped around the windings 152 (e.g., the end turns 153, FIG. 6), without an intermediate layer of varnish 166 between the component and the encapsulant 194.

Figure 12:
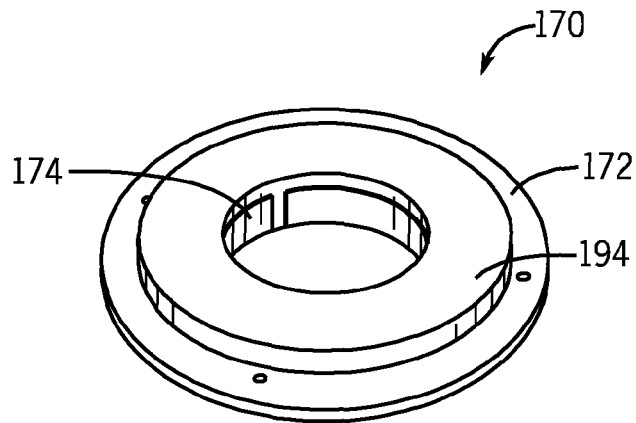
FIG. 12 is a perspective view of an embodiment of an encapsulated magnetic bearing actuator that may be employed in the integrated power module of FIG. 4.

FIG. 12 depicts an embodiment of a bearing actuator 170 that has been encapsulated. In certain embodiments, the bearing actuator 170 may be part of a radial magnetic bearing 128 or 130 (FIG. 4). The encapsulant 194 may be disposed on the electromagnetic coils 176 (FIG. 7) that are supported by the inner ring 174. For example, the encapsulant 194 may be disposed on the electromagnetic coils 176 through injection molding. The bearing stator 172 may generally encircle the encapsulated portion of the bearing actuator 174. In certain embodiments, the electromagnetic coils 176 may be varnished prior to encapsulation and/or wrapped with cloth 164 prior to encapsulation, as described above with respect to FIG. 7. However, in other embodiments, the encapsulant 194 may be disposed directly on the coils 176, or may disposed directly on cloth 164 that may be wrapped around the coils 176 (FIG. 6), without an intermediate layer of varnish 166 between the component and the encapsulant 194.

Figure 13:
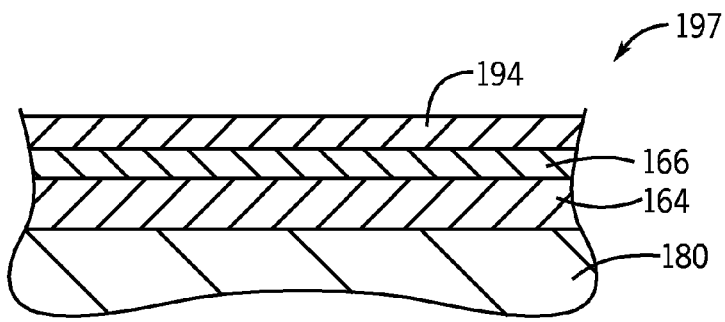
FIG. 13 is a cross-sectional view of an embodiment of an encapsulated component that may be employed in the integrated power module of FIG. 4.

FIG. 13 is a cross-sectional view of an embodiment of an encapsulated component 197. The encapsulated component 197 includes an integrated power module component 180 that has been wrapped in cloth 164 and coated and/or impregnated with varnish 166. According to certain embodiments, the component 180 may include stator windings 152. In these embodiments, the component 180 may be copper wire coated with high-temperature, pulse-endurance enamels. In certain embodiments, for example, where the component 180 includes windings of an end turn 153, the component 180 may be wrapped in cloth 164, which in certain embodiments, may be an electrical grade fiberglass cloth. However, in other embodiments, the cloth 164 may be omitted and the varnish 166 may be disposed directly on the component 180. Further, in other embodiments, the varnish 166 may be omitted while the cloth 164 is still applied. In other embodiments, the component 180 may include electromagnetic coils 176 of a bearing actuator 170. Further, in yet other embodiments, the component may include a thrust coil of an actuator for an axial bearing 140 (FIG. 4), a component of a sensor assembly 129, 131, or 141, or another suitable component of an integrated power module that is exposed to a nonpolar organic working fluid at an elevated temperature.

The encapsulant 194 may be a high temperature, highly filled epoxy encapsulant that is compatible with nonpolar organic working fluids, such as toluene and/or cyclohexane, at elevated temperatures of approximately 100° C. to 300° C., or more specifically, approximately 150° C. to 250° C., and all subranges therebetween. The encapsulant 194 may include an epoxy resin base that has single or multiple aromatic rings in its backbone. For example, the epoxy resin base may include a phenolic base resin or a naphthalene base resin. According to certain embodiments, the encapsulant 194 may include Stycast® 2762 FT, commercially available from Emerson & Cuming of Billerica, Mass.; Araldite® CW 9029, commercially available from Huntsman Corporation; a two part epoxy of Araldite® CW 9029 and Aradur® HW 9029, commercially available from Huntsman Corporation; or a two part epoxy of Araldite® CW 5725 and Aradur® HY5726, also commercially available from Huntsman Corporation; among others.

Further, the encapsulant 194 may include a filler content (e.g., mechanically reinforcing fillers) of at least approximately 50% by weight, or more specifically, at least approximately 60% by weight. According to certain embodiments, the fillers may be designed to minimize thermal expansion and to provide a high thermal conductivity, and to provide resistance to the organic working fluids. For example, in certain embodiments, the fillers may have a thermal conductivity of at least approximately 0.7 W/(m K). Moreover, in certain embodiments, the encapsulant 194 may include a softening agent, such as a diglycidylether of polypropyleneglycol, designed to inhibit cracking of the encapsulant 194. For example, the encapsulant 194 may include approximately 10-20% by weight of a softening agent, and all subranges therebetween. More specifically, the encapsulant 194 may include approximately 10% by weight of a softening agent. According to certain embodiments, the softening agent may include Araldite® CY 221, commercially available from Huntsman Corporation.

The encapsulant 194 may be designed to resist extraction by nonpolar organic working fluids at elevated temperatures of approximately 150° C. to 250° C. For example, the encapsulant 194 may have a shore durometer (i.e. shore D) hardness of greater than or equal to 90, 91, 92, 93, or 94, as measured by ASTM D2240-05 (2010) prior to exposure to the organic working fluid. Further, the encapsulant 194 may have a shore durometer hardness of greater than or equal to 85, 86, 87, 88, 89, 90, 91, 92, or 93, as measured by ASTM D2240-05 (2010) after exposure for at least approximately 168 hours to an organic working fluid, such as cyclohexane, at temperatures of approximately 180° C. In another example, the encapsulant 194 may have a shore durometer hard hardness of greater than or equal to 85, 86, 87, 88, 89, 90, 91, 92, or 93, as measured by ASTM D2240-05 (2010) after exposure for at least approximately 168 hours to an organic working fluid, such as cyclohexane, at temperatures of approximately 205° C. Further, the encapsulant 194 may have a shore durometer hard hardness of greater than or equal to 85, 86, 87, 88, 89, 90, 91, 92, or 93, as measured by ASTM D2240-05 (2010) after exposure for at least approximately 168 hours to an organic working fluid, such as cyclohexane, at temperatures of approximately 230° C.

Further, the encapsulant 194 may be designed to withstand at least 12 cycles of thermal cycling from approximately −20° C. to 165° C. without exhibiting visual cracks. More specifically, the encapsulant 194 may be designed to withstand at least 25 cycles of thermal cycling from approximately −20° C. to 165° C. without exhibiting visible cracks. Moreover, the volatile content of the encapsulant 194 that is extractable by the nonpolar organic working fluid may be less than or equal approximately 1.5% by weight, or more specifically less than or equal to approximately 1% by weight. Further, the encapsulant 194 also may have a glass transition temperature of at least approximately 100° C.

Figure 14:
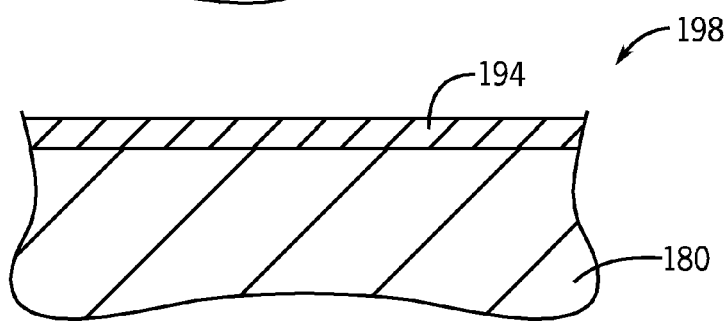
FIG. 14 is a cross-sectional view of another embodiment of an encapsulated component that may be employed in the integrated power module of FIG. 4.

FIG. 14 is a cross-sectional view of another embodiment of an encapsulated component 198. The encapsulated component 198 is similar to the encapsulated component 197, described above with respect to FIG. 13. However, rather than including a varnish 166 disposed between the component 180 and the encapsulant 194, the encapsulant 194 is disposed directly on the component 180. According to certain embodiments, the component 180 may include stator windings 152. In these embodiments, the component 180 may include copper wire coated with high-temperature, pulse-endurance enamels. In other embodiments, the component 180 may include electromagnetic coils 176 of a bearing actuator 170. Further, in yet other embodiments, the component may include a thrust coil of an actuator for an axial bearing 140 (FIG. 4), a component of a sensor assembly 129, 131, or 141, or another suitable component of an integrated power module that is exposed to a nonpolar organic working fluid at an elevated temperature.

Figure 15:
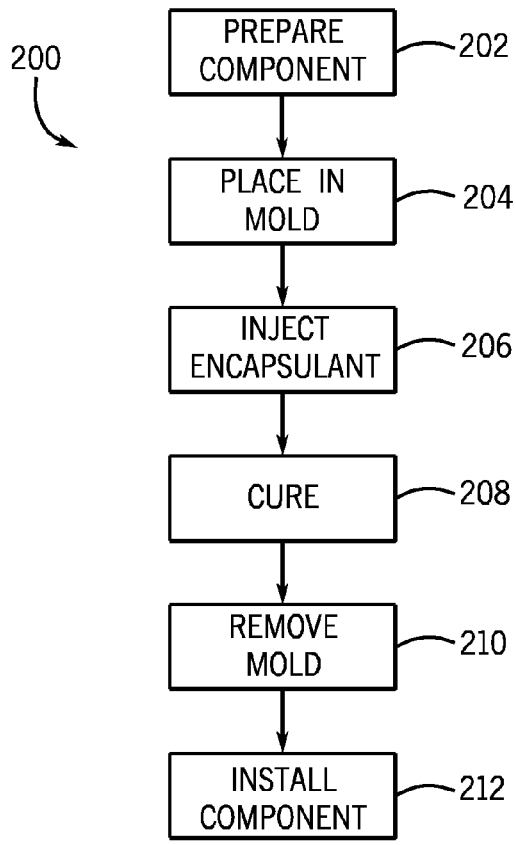
FIG. 15 is a flowchart depicting an embodiment of a manufacturing method for encapsulating an integrated power module component.

FIG. 15 is a flowchart depicting a method 200 for encapsulating a component that may be employed within an integrated power module. For example, the method 200 may be employed to encapsulate the stator 150, the bearings 128, 130, or 140, or the sensor assemblies 129, 131, or 141, shown in FIG. 4. The method 200 may begin by preparing (block 202) the component. For example, in certain embodiments where the component includes stator windings or magnetic bearing windings, the component may be wrapped with cloth and/or varnished as described above with respect to FIG. 9. However, in other embodiments, no preparation may be needed and block 202 may be omitted.

The processing method may then continue by placing (block 202) the component within a mold. According to certain embodiments, the mold may be designed to surround portions of the component to be encapsulated. For example, in embodiments where the component includes stator windings 152, the mold may be designed to encircle the interior and exterior of the end turns 153 (FIG. 6). Further, in certain embodiments, the mold may be preheated, for example, to approximately 60° C. to 80° C. to facilitate curing and reduced viscosity for improved flow of encapsulant within the mold. Once the component is disposed in the mold, the encapsulant may be injected (block 206) into the mold. For example, in embodiments where the component includes stator windings 152, the encapsulant may be injected into the interior of the end turns 153 and towards the exterior of the end turns 153 (FIG. 6). Further, in embodiments where the encapsulant is a two-part epoxy system, the encapsulant materials may be mixed prior to injection of the encapsulant into the mold.

The encapsulant may then be allowed to cure (block 208) within the mold. For example, the encapsulant may be cured for approximately 4-6 hours at a temperature of approximately 80° C. In another example, the encapsulant may be cured for approximately 2 hours at approximately 100° C. Further, in certain embodiments, the initial curing step may be followed by a post-curing step. For example, the encapsulant may be post-cured in the mold for approximately 2 hours at a temperature of approximately 140° C. In another example, the encapsulant may be post-cured for approximately 10 hours at a temperature of approximately 130° C. As may be appreciated, the curing process, temperatures, and/or times may vary based on factors such as the type of encapsulant employed and the size of the component, among others. After curing, the mold may be removed (block 210) and the encapsulated component may then be installed (block 212) within an integrated power module.

As described above, the varnished components and/or the encapsulated components may be particularly well suited for use in integrated power modules that circulate nonpolar organic solvents, such as cyclohexane and/or toluene, at elevated temperatures of approximately 100° C. to 300° C., or more specifically, approximately 150° C. to 250° C. The varnish and/or the encapsulant may provide a thick protective layer designed to provide bonding and sealing properties that inhibit contact between the underlying component and the nonpolar organic solvents. The protective layer may allow nonpolar organic solvents, such as toluene and/or cyclohexane, that are particularly efficient at recovering waste heat to be used in the ORC systems without degrading components of the integrated power modules.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a generator configured to receive a flow of an organic working fluid that flows at least through the generator or around an exterior of the generator within a casing, wherein the generator comprises:
a stator;
a permanent magnet rotor that rotates about an axis within the stator to generate electricity; and
one or more components disposed within the generator in one or more positions exposed to the flow of the organic working fluid, wherein the one or more components each comprise an underlying component, and an encapsulant that withstands exposure to the organic working fluid to inhibit contact between the underlying component and the organic working fluid.

2. The system of claim 1, wherein the one or more components comprise a stator electrical winding, a stator end turn, a radial magnetic bearing, an axial bearing, or a sensor assembly, or a combination thereof.

3. The system of claim 1, wherein the underlying component is wrapped with cloth, and wherein the encapsulant is disposed on the cloth.

4. The system of claim 1, wherein the organic working fluid comprises toluene, cyclohexane, or a nonpolar, organic solvent with a lower solubility than cyclohexane, and wherein the solubility is quantified by a Hildebrand solubility parameter.

5. The system of claim 1, wherein the encapsulant comprises a filled epoxy encapsulant comprising at least approximately 50% by weight of mechanically reinforcing fillers.

6. The system of claim 1, wherein the encapsulant is configured to withstand exposure to the organic working fluid at temperature of at least approximately 150° C. to 250° C.

7. The system of claim 1, wherein at least one of the one or more components is impregnated with a varnish configured to withstand exposure to the organic working fluid.

8. The system of claim 1 comprising:
a first organic Rankine cycle system comprising the generator and configured to circulate the organic working fluid through a cycle of expansion and pressurization; and
a second organic Rankine cycle system disposed in a cascade configuration with the first organic Rankine cycle system.

9. A system comprising:
- a one-piece casing having a passage between a first portion and a second portion of the one-piece casing, wherein the passage is configured to receive an organic working fluid through the one-piece casing;
- a turbine disposed in the passage of the one-piece casing and configured to expand the organic working fluid;
- a generator disposed in the passage of the one-piece casing and configured to receive a flow of the organic working fluid exiting the turbine, wherein the generator comprises:
  - a stator comprising an electrical winding end turn encapsulated by an encapsulant configured to withstand exposure to the organic working fluid to inhibit contact between the electrical winding end turn and the organic working fluid; and
  - a permanent magnet rotor configured to rotate within the stator to generate electricity.

10. The system of claim 9, wherein the generator is configured to direct the flow of the organic working fluid through the generator between the stator and the rotor.

11. The system of claim 9, wherein the electrical winding end turn is impregnated with a varnish configured to withstand exposure to the organic working fluid.

12. The system of claim 9, wherein the electrical winding end turn is wrapped in an electrical grade fiberglass cloth disposed between the electrical winding end turn and the encapsulant.

13. The system of claim 9, wherein the encapsulant comprises a filled epoxy encapsulant comprising at least approximately 60% by weight of mechanically reinforcing fillers.

14. The system of claim 9, comprising a radial magnetic bearing configured to support the permanent magnet rotor, wherein the radial magnetic bearing comprises electromagnetic coils encapsulated with the encapsulant.

15. The system of claim 14, wherein the electromagnetic coils are impregnated with a varnish configured to withstand exposure to the organic working fluid.

16. A method comprising:
- flowing an organic working fluid through a first one-piece casing having a first passage between a first portion and a second portion of the first one-piece casing;
- driving a first turbine disposed within the first passage of the first one-piece casing with the organic working fluid flowing through the first passage; and
- generating power with a first generator coupled to the first turbine, wherein the first generator is disposed within the first passage.

17. The method of claim 16, wherein the first generator comprises a stator with an exterior surface and rotor disposed within the stator.

18. The method of claim 17, comprising flowing the organic fluid along the exterior surface of the stator.

19. The method of claim 17, comprising flowing the organic fluid in a gap between the stator and the rotor.

20. The method of claim 16, comprising:
- flowing the organic working fluid exiting the first one-piece casing into a second one-piece casing having a second passage;
- driving a second turbine disposed within the second passage of the second one-piece casing with the organic working fluid; and
- generating power with a second generator coupled to the second turbine, wherein the second generator is disposed in the second passage.

* * * * *